(12) United States Patent
Higgs et al.

(10) Patent No.: US 9,479,801 B2
(45) Date of Patent: Oct. 25, 2016

(54) END USER-BASED PERSONALIZED AD INSERTION IN BROADCAST-BROADBAND HYBRID TERMINALS

(71) Applicant: TELEFONAKTIEBOLAGET L M ERICSSON (PUBL), Stockholm (SE)

(72) Inventors: Paul Higgs, Roswell, GA (US); Nilo Mitra, New York, NY (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 12 days.

(21) Appl. No.: 14/577,204

(22) Filed: Dec. 19, 2014

(65) Prior Publication Data

US 2016/0182923 A1 Jun. 23, 2016

(51) Int. Cl.

| | |
|---|---|
| *H04N 21/234* | (2011.01) |
| *H04N 21/81* | (2011.01) |
| *H04N 21/254* | (2011.01) |
| *H04N 21/2668* | (2011.01) |
| *H04N 21/6405* | (2011.01) |
| *H04N 21/643* | (2011.01) |
| *H04N 21/426* | (2011.01) |
| *H04N 21/845* | (2011.01) |

(Continued)

(52) U.S. Cl.
CPC ...... *H04N 21/23424* (2013.01); *H04N 21/235* (2013.01); *H04N 21/254* (2013.01); *H04N 21/25866* (2013.01); *H04N 21/2668* (2013.01); *H04N 21/42638* (2013.01); *H04N 21/6405* (2013.01); *H04N 21/64322* (2013.01); *H04N 21/812* (2013.01); *H04N 21/8455* (2013.01)

(58) Field of Classification Search
CPC .......... H04N 21/23424; H04N 21/2668; H04N 21/812; H04N 21/44016; H04N 21/235; H04N 21/254; H04N 21/25866; H04N 21/42638; H04N 21/6405; H04N 21/64322; H04N 21/8455

See application file for complete search history.

(56) References Cited

U.S. PATENT DOCUMENTS 8,151,295 B1 * 4/2012 Eldering ............ H04N 21/4331
725/34
9,066,115 B1 * 6/2015 Cherry ............... H04N 21/2668

(Continued)

FOREIGN PATENT DOCUMENTS

WO 2014004955 A1 1/2014

OTHER PUBLICATIONS

Nilsson, M., ID3 Tag Version 2, Mar. 26, 1998.

*Primary Examiner* — Pankaj Kumar
*Assistant Examiner* — Alexander Boyd

(57) ABSTRACT

A system and method for signaling timing and content of personalized ads to a hybrid terminal via a television broadcast/multicast network. The currently-present ad insertion markers in the transport stream of the broadcast/multicast content are replaced by a Service Information, SI, table that contains information corresponding to the replaced markers. The table-containing transport stream is then delivered to the hybrid terminal. The SI table may include a manifest to signal upcoming time slots for advertising. The manifest may provide information about sources from which the hybrid terminal can fetch personalized advertisements and may also identify available time slots in the transport stream for inserting the fetched ads. To enable the hybrid terminal to present personalized advertisements to its viewer, the SI table may identify an Ad Decision Server, ADS, from which the hybrid terminal can request targeted ads for playback to the viewer watching a broadcast/multicast TV program.

25 Claims, 9 Drawing Sheets

(51) Int. Cl.
  *H04N 21/235* (2011.01)
  *H04N 21/258* (2011.01)

(56) References Cited

U.S. PATENT DOCUMENTS

| | | | |
|---|---|---|---|
| 2002/0129362 A1* | 9/2002 | Chang | H04N 21/812 725/32 |
| 2004/0268387 A1 | 12/2004 | Wendling | |
| 2006/0287915 A1* | 12/2006 | Boulet | H04N 21/23424 725/35 |
| 2008/0313669 A1* | 12/2008 | Acharya | H04L 65/4084 725/34 |
| 2009/0217318 A1* | 8/2009 | Versteeg | H04N 21/23424 725/32 |
| 2011/0202270 A1* | 8/2011 | Sharma | G06Q 30/02 701/533 |
| 2012/0110618 A1* | 5/2012 | Kilar | H04N 21/23424 725/34 |
| 2012/0131610 A1* | 5/2012 | Fernandez Gutierrez | H04N 21/23424 725/34 |
| 2013/0097634 A1* | 4/2013 | Jin | H04N 21/812 725/34 |
| 2014/0040026 A1* | 2/2014 | Swaminathan | G06Q 30/02 705/14.53 |
| 2015/0012956 A1* | 1/2015 | Kim | H04N 21/2381 725/110 |
| 2015/0325268 A1* | 11/2015 | Berger | H04N 21/812 386/248 |
| 2016/0006785 A1* | 1/2016 | Zhang | H04N 21/812 709/219 |

* cited by examiner

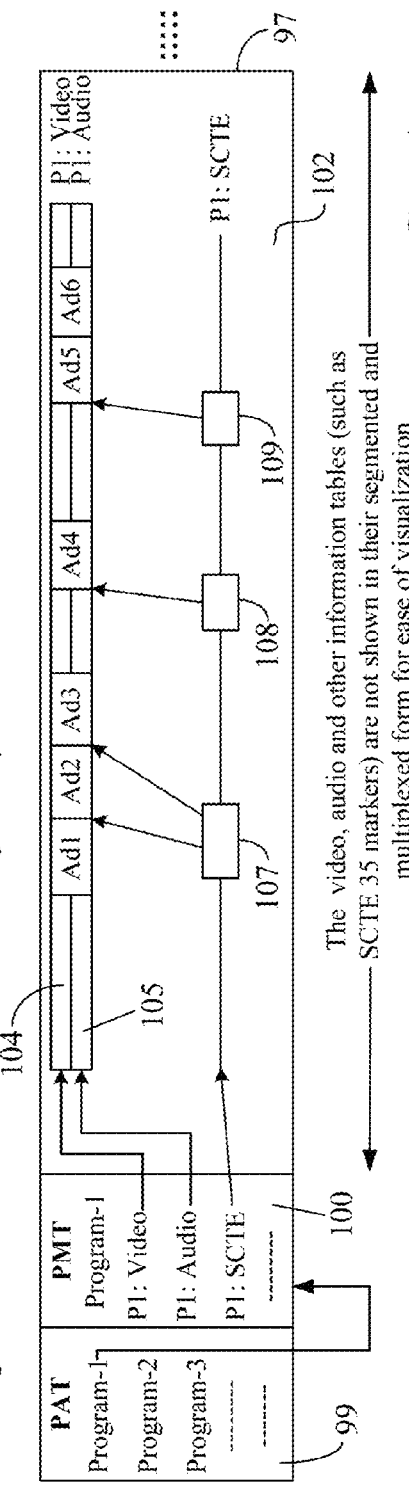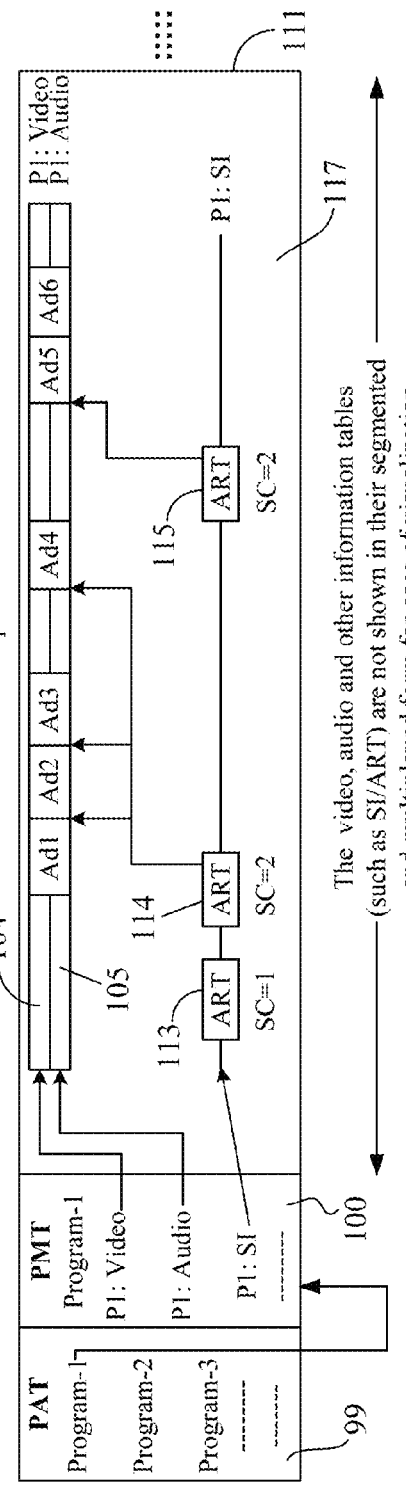

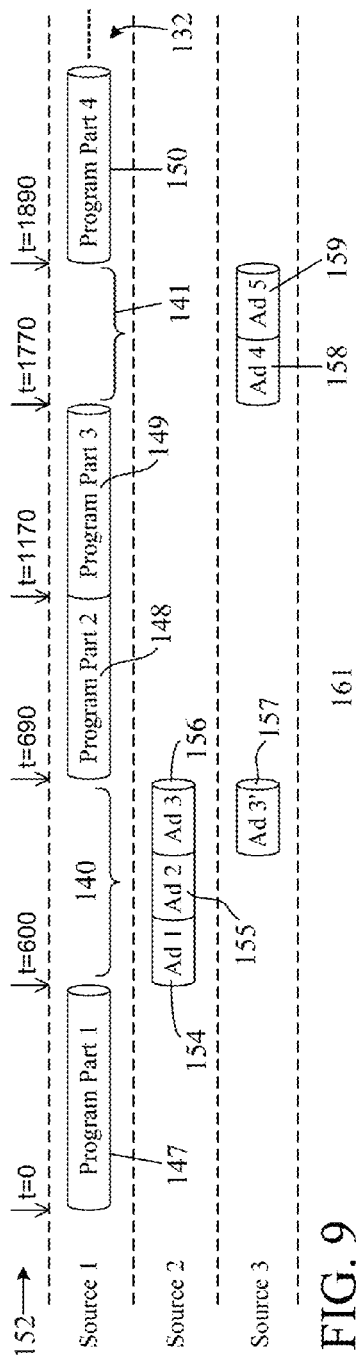

```
<period start=0 duration=600>
    <adaptationSet>dvb://12.0.2/</adaptationSet>    ←167
</period>
<period start=600 duration=30>                       ←163
    <representation type=fbr>http://adserver.com/adslot1</representation>
</period>
<period start=630 duration=30>                       ←164
    <representation id=2 type=fbr>http://adserver.com/adslot2</representation>
</period>
<period start=660 duration=30>                       ←165
    <representation id=3 type=fbr>http://adserver.com/adslot3</representation>
    <representation id=3 type=abr>                   ←166
        http://adserver.com/adslot3adaptive.mpd</representation>
</period>
<period start=690 duration=480>                      ←168
    <adaptationSet>dvb://12.0.2/</adaptationSet>
</period>
<period start=1170 duration=600>                     ←162
    <adaptationSet>dvb://12.0.2/</adaptationSet>     ←169
</period>
```

END USER-BASED PERSONALIZED AD INSERTION IN BROADCAST-BROADBAND HYBRID TERMINALS

TECHNICAL FIELD

The present disclosure generally relates to displaying advertisements on a hybrid terminal such as, for example, a smart television (TV). More particularly, and not by way of limitation, particular embodiments of the present disclosure are directed to a system and method to signal timing and content of interstitial programming such as, for example, advertisements personalized for a viewer, to a hybrid terminal via a television broadcast network, using one or more tables embedded in the transport stream of the television content instead of currently-used advertisement insertion markers such as, for example, the Society of Cable Telecommunications Engineers 35 (SCTE 35) advertisement insertion markers.

BACKGROUND

Hybrid terminals are now widely available worldwide in many form factors such as, for example, Set-Top Boxes (STBs), smart TVs, digital media players, Blu-ray players, video game consoles, digital hotel television systems, and so on. Hybrid terminals not only provide conventional broadcast television functionality, but also have integrated Internet and web access features such as, for example, access to the worldwide web (www) portion of the Internet. Thus, hybrid terminals are examples of technological convergence between computers and television sets/STBs and, hence, also include network-connected interactive devices that utilize television type display outputs. The software that runs a hybrid terminal may be pre-loaded onto the device, or updated or installed on-demand via an online application store (app store) or app marketplace, in a manner similar to what is done for modern smartphones.

It is noted here that the terms like "user terminal," "client terminal," and "hybrid terminal" may be used interchangeably herein to refer to a hybrid terminal—in any form factor—that supports connections to a broadcast network and a broadband network.

FIG. 1 illustrates a system 15 showing a hybrid terminal 17 connected to a conventional television broadcast network 19 and a broadband network 20. Some examples of the hybrid terminal 17 are provided in the preceding paragraph. For the purpose of the present disclosure, each of the networks 19-20 is considered to be a fully digital network. The hybrid terminal 17 may support playback of conventional broadcast television content through its connection to the television broadcast network 19 such as, for example, a terrestrial broadcast TV network or an over-the-air TV broadcast, a cable TV network, or a satellite TV network. Besides the traditional functions of television sets and STBs, the hybrid terminal 17 can also support delivery of online interactive media, Internet TV, Over-the-Top (OTT) content, as well as on-demand streaming media through its connection to the broadband network 20. The broadband network 20 may be an Internet Protocol (IP) based network such as, for example, a private IP network owned by a telco or cable provider or the publicly-accessible Internet. The hybrid terminal 17 may provide home networking access to record videos on a hybrid terminal-based local storage drive (not shown in FIG. 1) and may also allow viewers to search, find and play videos, movies, photos, and other content from the Internet, or through a cable TV provider or a satellite TV provider, or an over-the-air TV broadcast network.

Thus, the hybrid terminal 17 supports a model where broadcasted live (or linear) TV content is consumed through a digital broadcast connection supplemented with a digital broadband connection to the Internet. The digital broadcast connection may be, for example, an Advanced Television Systems Committee (ATSC), Digital Video Broadcasting (DVB), or Integrated Services Digital Broadcast (ISDB) based broadcast connection provided by terrestrial, cable, or satellite access based broadcast network 19. The digital broadband connection or "channel" may allow the hybrid terminal 17 to access additional audio-visual (AN) content that can be downloaded or streamed to the hybrid terminal 17, as well as a signaling path to back-end servers (not shown in FIG. 1)—in the broadcast network 19 and/or the broadband network 20—to retrieve additional information to enhance the broadcast experience for the viewer.

The hybrid terminal 17 may be a Hybrid Broadcast Broadband TV (HbbTV) terminal that supports the broadcast and broadband delivery of entertainment to the end consumer. An HbbTV terminal provides a single user interface for delivery of digital broadcast TV and broadband TV to the consumer. The HbbTV terminal can operate over different digital broadcasting technologies such as terrestrial, cable, or satellite broadcasts.

Insertion of an advertisement (also referred to as an "Ad" or "ad") in linear (or live) broadcast TV is traditionally performed using Society of Cable Telecommunications Engineers (SCTE) standards such as, for example, the American National Standards Institute (ANSI)/SCTE 35 standard, titled "Digital Program Insertion Cueing Message for Cable" (2013), available at www.scte.org; the relevant disclosure of this standard is incorporated herein by reference in its entirety. As part of such ad insertion, SCTE 35 markers—which may also be referred to as "ad insertion markers" or "splice information tables"—are carried in the broadcast content to indicate the presence of ad insertion points or "splice events." A splice information table notifies downstream devices of splice events, such as a break in the network programming offering the opportunity to insert ads or a return from a network break. A splice information table, which pertains to a given program, is carried in one or more Packet Identifiers (PIDs) referred to by that program's Program Map Table (PMT).

The timing information provided through an SCTE 35 marker may be used by a splicer in the television service provider's headend. The splicer, functioning as an Ad Decision Manager (ADM), may query an Ad Decision Server (ADS) in the broadcast network 19 for an appropriate advertisement to place at an ad insertion point—in the Motion Picture Experts Group 2 (MPEG2) Transport Stream (TS) of the broadcast content—identified by the corresponding SCTE 35 marker or to replace an existing ad already inserted at the national headend. The splicer may perform such querying using the SCTE-130 protocol defined, for example, in the ANSI/SCTE 130-1 document, titled "Digital Program Insertion—Advertising Systems Interfaces Part 1: Advertising Systems Overview" (2013), available at www.scte.org, and in the ANSI/SCTE 130-3 document, titled "Digital Program Insertion—Advertising Systems Interfaces Part 3: Ad Management Service (ADM) Interface" (2013), available at www.scte.org; the relevant disclosures of both of these documents are incorporated herein by reference in their entireties.

The ADS may use data from back-end server(s) or database(s) such as data related to ongoing ad campaigns, regional demographic information, data about the channel being watched, and the like, to decide on the advertisement to be placed. The ADS returns this information—about the ad to be placed—to the ad splicer, which may then obtain the appropriate ad and splice it seamlessly at the ad insertion point. The MPEG2 TS, with such ads inserted by the splicer in the service provider's headend, is then delivered to the hybrid terminal 17.

The broadcast TV industry today performs the advertisement insertion or replacement using servers located in the facilities of the company providing or delivering the programming. These servers (not shown in FIG. 1) typically perform regionalized advertising insertion; the inserted ads are then broadcast to subscribers in the related geographical region. In some cases, the region can cover a number of small localized areas. Some advertising insertion servers can perform selection and insertion of an advertisement to an individual user level, but the operational overheads associated with these are expensive and complex because the servers must create a unique program stream for each user and deliver it using unicast techniques.

Terminal-based content insertion allows for personalized selection and playback of advertising. Some existing solutions, such as those used for program content delivery through Video on Demand (VoD), use a form of playlist for individualized advertising, wherein the items in the playlist—including pre-roll and post-roll advertisements—are created for each user and both the program content and the advertisements are delivered to individual users via broadband mechanism.

On the other hand, the MPEG Dynamic Adaptive Streaming over HTTP (MPEG DASH) (where "HTTP" refers to Hypertext Transfer Protocol) Industry Forum is presently developing a specification which describes the format of a manifest file for performing advertising content selection for client-based insertion into a unicast streaming session to be implemented in smart TVs or other hybrid terminals.

SUMMARY

The methods described above for the so-called "individualized" content delivery are only used for unicast delivered content via broadband. Such content can be VoD content or Live content delivered Over The Top (LOTT). However, these methods do not exploit the advantages of using broadcast or multicast delivery mechanisms for the main program.

Existing advertising solutions do not provide a mechanism for the hybrid terminal's determination of the upcoming advertising slots in the broadcast or IP multicast delivered program, in conjunction with individual selection of advertising material for insertion into those advertising slots. Although it may be possible for the network-centric advertisement insertion markers—the SCTE 35 markers—to be delivered to the hybrid terminal, this approach may require substantial logic or technical improvements at the hybrid terminal because such an approach is not primarily designed for use in a terminal. Furthermore, the digital television industry is moving away from bit stream-specific signaling, which includes specifically-coded data placed into an MPEG2 TS. Hence, processing of SCTE 35 markers by individual hybrid terminals may not be supported by the digital television industry or the terminal vendors.

In addition, the above-mentioned approach specified by the MPEG DASH Industry Forum is not designed for, and does not consider any use in, broadcast terrestrial or multicast delivered programming.

Furthermore, although regionalized ads are broadcasted, these broadcasted ads are not personalized to a specific viewer, but are rather chosen based on broadly-defined demographic information in an attempt to serve all viewers in a localized region. Most targeted advertising in industry solutions is normalized to a household/subscription or a region, and not personalized to a specific end user. Indeed, this has been the main problem with advertising in broadcast TV networks. The absence of targeting advertisements to an individual user in a broadcast TV network makes it much less attractive to advertisers because it does not provide the necessary end user engagement with the ad content, which is generalized for the user's geographic region.

Personalization in online (Internet) ad placements has provided advertisers with a much more capable targeting opportunity and shown TV distributors the potential to use targeting to gain better revenues. For example, hybrid terminals have a direct connection to the Internet and, like all Internet-connected devices, the hybrid terminals also allow a user to configure/personalize some aspects of the device, such as creating bookmarks, favorites, personally-selected apps, and so on. A hybrid terminal's IP-based back-channel to the broadcast service provider allows the end user to "log in" to his/her profile associated with a subscription TV service and configure the viewing experience in a manner that is directly personalized to his preferences.

The problem of targeted advertising is mitigated somewhat in pay-per-view TV solutions, such as those provided by cable TV or IPTV operators, because these operators have access to much more specific user information such as, for example, the user's street address, user's subscription packages, channels frequently watched by the user, and the like. The street address information can be correlated to income levels, the information about channels watched can lead to generalized information on user's interests, and so on. All of these correlated data can be then used to select appropriate advertisements. However, even in such cases, it is not possible to have true end user personalization, especially in a multi-user household where different users have different viewing habits.

One solution offers an opportunity for advertisers to target satellite and cable broadcast audiences based on a plethora of demographic information. For example, using this solution, a cable network operator may provide targeted ads to geographical regions watching linear (broadcast) programming. In another solution, the cable operator may rely on a database that combines names and addresses of homes in its network footprint with third-party data to deliver unique ads based on the demographic profiles of the cable operator's subscriber households. The third-party data may include creditworthiness data from a national credit bureau, automotive data from a statewide governmental agency, and ethnic data from government census files. In this manner, specific advertisements may be targeted to subscriber households in particular geographical regions. However, this sort of "personalization" experience is one where an individual user's ad-viewing preferences are normalized to that of the entire household because such "personalization" is based on information available from the household-specific service subscription or other data that does not and cannot identify an individual user within the broadcast subscription.

In another approach, each STB at a household is assigned a profile based on demographic data and each ad is broadcast with a profile associated with that ad. STBs that have their profile matching with an ad's profile use the ad, whereas other STBs which do not match the ad's profile discard the ad. This profiling approach, in essence, is targeting using better demographics, wherein an STB is normalized to a profile based on subscription data, not on individual user choice.

In a still another approach, the content of the main broadcasted program is "searched" for keywords using fingerprinting and watermarking technologies, and ads related to similar topics are inserted for that program. An information service associated with the broadcast content also may be provided.

It is observed from the foregoing discussion that existing advertising solutions for a broadcast network not only fail to provide a mechanism for terminal-based determination of the advertising slots in the broadcast/multicast delivered program, but they also fail to offer truly individualized selection of advertising material for insertion into those advertising slots.

It is therefore desirable to inform a hybrid terminal, such as a smart TV, an IPTV terminal, or an STB, about the program breaks in the transport stream of the broadcast/multicast content in which advertisement insertion can occur. It is further desirable to enable the terminal to retrieve viewer-specific personalized advertisements and insert those ads into the available program breaks for the end user/viewer watching the television programs on the terminal. Instead of using unicast or broadband channels as is the case with existing advertising options, it is desirable to provide relevant information about the advertisement slots to the hybrid terminal via broadcast or multicast distribution.

The present disclosure offers a solution to the above-mentioned problem of how to signal timing and content of interstitial programming such as, for example, personalized advertisements, to a hybrid terminal via a television broadcast network. Particular embodiments of the present disclosure provide a broadcast system and method where the existing ad insertion markers, such as the SCTE 35 markers, in the transport stream of the broadcast content are replaced by a table that contains information corresponding to the replaced markers. The table-containing transport stream is then delivered to the hybrid terminal to enable the hybrid terminal to manage placement of interstitial programming during playback of the broadcasted television programs.

It is noted here at the outset that, for ease of discussion, the term "broadcast" is primarily used throughout the discussion herein and only broadcast network-based embodiments are illustrated. However, it is understood that the teachings of the present disclosure equally apply, with suitable modifications (if needed), to television content delivery through multicast. Hence, depending on the context of discussion, the term "broadcast"—as applied to the teachings of the present disclosure—may also refer to the television programming delivered through multicast.

As part of signaling the timing of upcoming ad insertion slots, particular embodiments of the present disclosure provide for a system and method in which an MPEG DASH manifest is delivered to the hybrid terminal via the broadcast or multicast transport stream and used to signal upcoming time slots for advertising or other interstitial programming. In one embodiment, a new DVB Service Information (SI) table—which may be the Ad Replacement Table (ART) discussed herein—is used to deliver the MPEG DASH manifest or a link to the MPEG DASH manifest. The MPEG DASH manifest contains information about timing of upcoming ad insertion slots in the MPEG2 TS. As is known, DVB SI tables are inserted in the DVB MPEG2 TS by a service provider to describe the programs and events in the transport stream sent to the hybrid terminal. For example, the European Telecommunications Standards Institute (ETSI) European Standard (EN) document ETSI EN 300 468, version 1.14.1, titled "Digital Video Broadcasting (DVB); Specifications for Service Information (SI) in DVB systems" (2014-05), available at www.etsi.org, describes such DVB SI tables; the relevant disclosure of this document is incorporated herein by reference in its entirety. The MPEG DASH manifest may also provide to the hybrid terminal the Uniform Resource Locators (URLs) of one or more advertisements that can be inserted by the hybrid terminal. The hybrid terminal can then fetch the associated ad content from the identified URL through the broadband channel. The fetched advertising may be personalized to the terminal's viewer. The personalized ad may be then inserted in the appropriate ad slot by the hybrid terminal while presenting the broadcast or multicast programming to the viewer.

As part of signaling the content of interstitial programming to enable the hybrid terminal to present highly individualized advertisements to its viewer, particular embodiments of the present disclosure use the above-mentioned ART in the MPEG2 TS to identify an Ad Decision Server (ADS). As discussed earlier in the "Background" section, currently, a splicer on the network side queries an ADS for advertisements, and no queries to the ADS are sent from the hybrid terminal itself. Existing broadcast solutions do not use any interaction with user terminals in determining ad placements. However, according to particular embodiments of the present disclosure, by signaling the ADS to the hybrid terminal, the ART identifies the server from which the hybrid terminal can request targeted ads. The ART also replaces the existing SCTE 35 ad insertion markers, which do not reach the hybrid terminal in traditional broadcasting. Hence, in one embodiment, the ART may include timing information equivalent to the timing information conveyed by the replaced SCTE 35 markers. In one embodiment, such timing information in the ART may identify the ad insertion points in the transport stream, for example, through the above-mentioned MPEG DASH manifest.

In particular embodiments, sufficiently in advance of an available advertising slot in the broadcasted program, an ART describing the location/URL of an ADS may be prepared by the network/broadcast service provider (SP) and broadcast to all terminals receiving that program. When this ART is received and processed by a hybrid terminal, the terminal may query the URL provided in the ART using an HTTP request. The HTTP request may append to the URL additional information that uniquely identifies the end user, thereby allowing the ADS to query the service provider's Business Support System (BSS) and analytics server(s) as well as any ongoing ad campaigns to find the appropriate advertisements most suitable for this particular user. It is assumed here that the user has previously provided to the service provider some information related to his/her viewing preferences, age, gender, other interests, and the like, which are stored in the SP's BSS and associated with the additional information that can uniquely identify the user. Because this user-specific information is voluntarily given, concerns about violation of an end user's privacy are considerably reduced. The analytics server(s) can provide to the ADS more dynamic information related to the user's previous viewing activity, what others with similar interests watched in the past, and so on.

The ADS, based on the end user preferences and analytics results, may return a set of advertisement content identifiers from currently ongoing ad campaigns that meet the end user's preferences. These results may be stored in the hybrid terminal. When another ART is subsequently encountered (by the hybrid terminal) indicating an ad placement opportunity, the stored results may be queried and the associated ads may be fetched by the hybrid terminal from an ad content server. One or more of these fetched ads may be used to replace any local/regional/national ads already present in the transport stream, such as, for example, the MPEG2 TS delivered to the hybrid terminal. These new ads are truly personalized and specific to the end user because they were chosen to match that user's previously-identified preferences. When additional ARTs are subsequently encountered in the transport stream indicating ad placement opportunities, the hybrid terminal may select, fetch, and place different ads from the stored results.

In this manner, the present disclosure provides a solution for ad insertion for legacy broadcasting at the end user's terminal based on the end user's specifically chosen preferences, and not based on general preferences selected from demographics data or household data, as is done in the current industry solutions. Furthermore, through an MPEG2 TS-based DVB SI table, ad insertion points may be signaled to a hybrid terminal to identify ad slots where the local/regional/national ad already in the program can be replaced at the terminal by an end user-targeted ad. As noted earlier, in existing broadcast solutions, the SCTE 35 markers are removed before sending the MPEG2 TS to the hybrid terminal. Hence, in particular embodiments of the present disclosure, this absence of the SCTE 35 markers is compensated by a DVB SI table that contains timing information corresponding to the timing information conveyed by these markers so as to provide the "missing" timing information to the hybrid terminal to enable it to manage placement of personalized ads or other interstitial programs.

In one embodiment, the present disclosure is directed to a method of signaling interstitial programming to a terminal via a television broadcast network for playback to a viewer associated with the terminal. The terminal is coupled to the television broadcast network. In particular embodiments, the terminal may be a hybrid terminal, an IPTV terminal, or a hybrid terminal functioning as an IPTV terminal. The method comprises performing the following by the television broadcast network: (i) receiving broadcast content containing television programs; (ii) creating a transport stream of the broadcast content; (iii) preparing a table containing information corresponding to one or more ad insertion markers existing in the broadcast content and used solely in the creation of the transport stream; (iv) replacing, in the transport stream, the existing ad insertion markers with the table; and (v) delivering the transport stream with the table to the terminal to manage placement of interstitial programming during playback of the television programs.

As noted earlier, the transport stream may be an MPEG2 TS, the table may be a DVB SI table, and the ad insertion markers may be SCTE 35 ad insertion markers.

In one embodiment, the interstitial programming includes advertisements and the DVB SI table may include either an MPEG DASH based manifest or a Uniform Resource Locator (URL) to the MPEG DASH manifest, wherein the MPEG DASH manifest contains information about timing of upcoming ad insertion slots within the MPEG2 TS.

In another embodiment, for each ad insertion slot, the MPEG DASH based manifest may additionally contain one or more of the following information: (i) identification of one or more sources available to supply respective advertising material for the duration of the ad insertion slot; and (ii) for each identified source, a source-specific delivery format for the respective advertising material.

In one embodiment, the television broadcast network may place a server URL in the DVB SI table, wherein the server URL identifies a decision server—such as an ADS—in the television broadcast network that manages selection of advertisements to the terminal. The television broadcast network may then provide the DVB SI table to the terminal with a first indication that informs the terminal of the presence of the server URL, thereby enabling the terminal to contact the decision server for advertisements.

In one embodiment, the decision server may: (i) receive a request from the terminal, wherein the request includes information individually identifying the viewer of the terminal; (ii) query one or more databases to obtain information about one or more viewer-specific personalized advertisements to be retrieved by the terminal for playback to the viewer; and (iii) send a result to the terminal, wherein the result may include a respective ad-specific URL for each viewer-specific personalized advertisement to be sent to the terminal. Each ad-specific URL may identify a respective content server from which a corresponding viewer-specific personalized advertisement is to be retrieved by the terminal.

The broadcast network may prepare a second DVB SI table with a second indication that notifies the terminal of one or more ad insertion slots available within the MPEG2 TS, thereby enabling the terminal to select from the result sent by the decision server at least one viewer-specific personalized advertisement that is time-wise possible for a specific ad insertion slot within the MPEG2 TS. The network may then deliver the second DVB SI table with the second indication to the terminal via the MPEG2 TS.

In a further embodiment, the present disclosure is directed to a method of presenting interstitial programming on a terminal associated with a viewer. The terminal is coupled to a television broadcast network that delivers broadcast television programs to the terminal. The method comprises performing the following by the terminal: (i) receiving a transport stream of the broadcast television programs from the television broadcast network, wherein the transport stream includes a table that contains timing information which is equivalent to the timing information conveyed by ad insertion markers that were previously present in the broadcast content prior to the receipt of the transport stream by the terminal; (ii) processing the timing information in the table to identify time slots in the transport stream that are available for interstitial programming; and (iii) managing placement of interstitial programming in the identified time slots during playback of the television programs on the terminal.

In one embodiment, the interstitial programming includes advertisements, and the terminal may receive an MPEG DASH based manifest through the television broadcast network-sent DVB SI table. The MPEG DASH based manifest may contain: (i) information about timing of upcoming ad insertion slots within the MPEG2 TS, wherein the ad insertion slots are the time slots available for advertisements; (ii) for each ad insertion slot, identification of one or more sources available to supply advertising material for the duration of the ad insertion slot; and (iii) for each identified source, a source-specific delivery format for the advertising material. The terminal may: (i) parse the MPEG DASH manifest to identify the sources; (ii) based on the parsing of the MPEG DASH manifest, request respective advertising material from one or more identified sources depending on the source-specific delivery format; (iii) receive the requested advertising material; (iv) store the received advertising material; and (v) place at least some of the received source-specific advertising material into one or more of the upcoming ad insertion slots for presentation to the viewer.

The terminal may request and receive the advertising material through an Internet Protocol (IP) network based broadband connection.

In another embodiment, the terminal may: (i) receive the network-supplied DVB SI table with a server URL therein, wherein the server URL identifies a decision server—such as an ADS—in the television broadcast network that manages selection and delivery of advertisements to the terminal; (ii) receive a user ID from the viewer, wherein the user ID individually identifies the viewer; (iii) augment the server URL by appending the server URL with the user ID along with a device ID of the terminal; (iv) send a request to the decision server using the augmented server URL; and (v) receive a result from the decision server, wherein the result includes a respective ad-specific URL for each viewer-specific personalized advertisement to be retrieved by the terminal and information about corresponding duration of each viewer-specific personalized advertisement to be retrieved by the terminal. Each ad-specific URL may also identify a respective content server from which a corresponding viewer-specific personalized advertisement is to be retrieved by the terminal.

In one embodiment, the terminal may send an HTTP request to the decision server and receive an HTTP response from the decision server via an IP network based broadband connection.

In a further embodiment, the terminal may also perform the following as part of managing placement of interstitial programming: (i) receive a second DVB SI table from the television broadcast network, wherein the second DVB SI table notifies the terminal of one or more ad insertion slots available within the MPEG2 TS; (ii) based on the result received from the decision server, select at least one viewer-specific personalized advertisement that is time-wise possible for a specific ad insertion slot within the MPEG2 TS; (iii) retrieve the selected viewer-specific personalized advertisement from the respective content server using the ad-specific URL for the content server; and (iv) present the retrieved viewer-specific personalized advertisement to the viewer.

The terminal may also send a report to the television broadcast network, wherein the report contains information about each viewer-specific personalized advertisement retrieved from the respective content server and played back to the viewer by the terminal. In one embodiment, such "reporting" may be performed by the terminal after ad slot indicators are provided by the television broadcast network using MPEG DASH manifest and personalized ad content is inserted into the broadcast or multicast programming.

In another embodiment, the present disclosure is further directed to a television broadcast network for signaling advertisements to a terminal for playback to a viewer associated with the terminal. The terminal is coupled to the television broadcast network. As before, in one embodiment, the terminal may be a hybrid terminal, an IPTV terminal, or a hybrid terminal functioning as an IPTV terminal. The television broadcast network may comprise: (i) a video processing system that receives broadcast content containing television programming and generates an MPEG2 Elementary Stream (ES) of the broadcast content; and (ii) a headend coupled to the video processing system and the terminal. In the broadcast network, the headend is operative to: (i) create an MPEG2 TS from the MPEG2 ES of the broadcast content; (ii) prepare a DVB SI table containing information corresponding to one or more SCTE 35 ad insertion markers associated with the MPEG2 TS; (iii) substitute the one or more SCTE 35 ad insertion markers in the MPEG2 TS with the DVB SI table; and (iv) deliver the MPEG2 TS with the DVB SI table to the terminal to manage placement of advertisements during playback of the television programming.

In a further embodiment, the present disclosure is directed to a hybrid terminal for presenting advertisements to a viewer associated with the hybrid terminal. The hybrid terminal is coupled to a television broadcast network that delivers broadcast television programs to the hybrid terminal. The hybrid terminal comprises: (i) a display unit for displaying the advertisements to the user; (ii) a memory for storing program instructions; (iii) a network interface for receiving broadcast and broadband content; and (iii) a processor coupled to the memory, the display unit, and the network interface. The network interface includes a broadcast television interface to receive broadcast television programming, and a broadband interface to interact with broadcast television network servers, retrieve multicast television programming or receive advertisements for subsequent insertion. The processor is configured to execute the program instructions. Upon execution of the program instructions by the processor, the hybrid terminal is operative to: (i) receive an MPEG2 TS of the broadcast television programs from the television broadcast network, wherein the MPEG2 TS includes a DVB SI table instead of SCTE 35 ad insertion markers, and wherein the DVB SI table contains timing information that is equivalent to the timing information conveyed by the SCTE 35 ad insertion markers; (ii) process the timing information in the DVB SI table to identify time slots in the MPEG2 TS that are available for the advertisements; and (iii) manage placement of the advertisements in the identified time slots during playback of the television programs so as to present the advertisements to the viewer through the display unit.

The present disclosure thus enhances the broadcast/multicast transport stream with an ART to carry information about an ad decision server as well as timing information about the ad placement slots. The information added to the broadcast transport stream allows a hybrid/IPTV terminal to perform highly personalized ad placements at the terminal itself for the specific end user. The television broadcast network may use end user identification information sent from the end user's viewing terminal to add to the heuristics used by the backend servers to more specifically target the ads served to this end user's preferences. The terminal may then replace the existing local/regional/national ads with user-specific ads inserted in the ad insertion slots identified through an MPEG DASH based manifest contained in the ART.

BRIEF DESCRIPTION OF THE DRAWINGS

In the following section, the present disclosure will be described with reference to exemplary embodiments illustrated in the figures, in which:

FIGS. 7A-7C illustrate how ARTs may be sent via an MPEG2 TS according to particular embodiments of the present disclosure;

FIG. 9 shows an exemplary sequence of main TV programs and associated avails in the broadcast content portion of the MPEG2 TS in FIG. 8;

FIG. 10 is an exemplary pseudo representation of an MPD manifest for the program sequence in FIG. 9.

DETAILED DESCRIPTION

Figure 1:
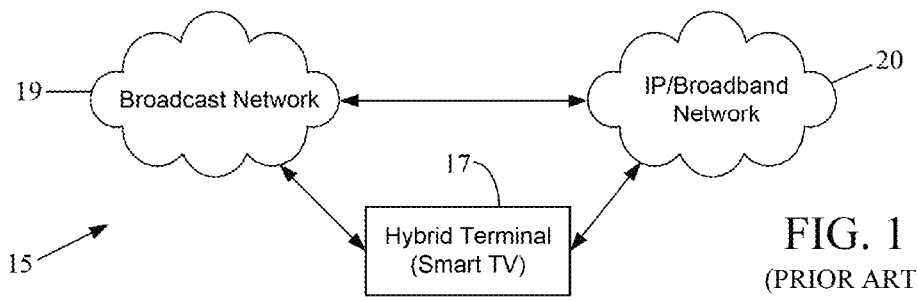
FIG. 1 illustrates a system showing a hybrid terminal connected to a conventional television broadcast network and a broadband network.

In the following detailed description, numerous specific details are set forth in order to provide a thorough understanding of the present disclosure. However, it will be understood by those skilled in the art that the teachings of the present disclosure may be practiced without these specific details. In other instances, well-known methods, procedures, components and circuits have not been described in detail so as not to obscure the present disclosure. Additionally, as noted before, it should be understood that although present disclosure is described primarily in the context of television programming delivered through a broadcast network, the disclosure can be implemented for any other type of audio-visual content such as, for example, movies, non-television video programming or shows, and the like, and also for multicast delivered television programming.

It is observed at the outset that the term "interstitial programming," as used herein, refers to textual, video, audio, or audio-visual content inserted at pre-determined ad insertion points or splice points in the linear flow of the main television programming being delivered to a hybrid terminal through broadcast/multicast. The most widely-recognized "interstitial programming" is the commercial advertisements played during a TV broadcast. However, the "interstitial programming" may not be limited to just advertisements—whether commercial or not, but may also include non-advertisement type audiovisual content and various non-commercial programs such as, for example, video clips, news clips, a specific audio clip, and the like. For ease of understanding the principle of the present disclosure, however, the readily-recognized terms "advertisement" or "ad" have been primarily used in the discussion below merely as a convenient shorthand for the more generic term "interstitial programming."

Furthermore, as before, the terms like "user terminal," "client terminal," "subscriber terminal," and "hybrid terminal" may be used interchangeably herein to refer to a hybrid terminal—in any form factor—that supports connections to a broadcast/multicast network and a broadband network. The connection to the broadcast network allows the hybrid terminal to receive the broadcasted content and signals through a transport stream, and the connection to the broadband network provides a "back channel" that allows the hybrid terminals to communicate with various network servers through an IP network such as the Internet. The broadcast/multicast transport stream of the programs may be delivered to the hybrid terminal according to the below-discussed teachings of the present disclosure. It is noted here that because the teachings of the present disclosure equally apply to a transport stream delivered by a television broadcast network via traditional broadcast means (terrestrial/satellite/cable means) or IP multicast means, the term "hybrid terminal" is also used below to include a terminal that supports IP multicast functionality such as, for example, an IPTV terminal, an IP Set-Top Box (IP-STB), or a hybrid terminal having IPTV functionality such as, for example, when the hybrid terminal operates as an IP-STB for an IP delivered channel. Thus, strictly speaking, even if a "hybrid terminal" may not support the IPTV functionality in some embodiments, the term "hybrid terminal" is still primarily used below for the sake of convenience and ease of discussion, and is meant to refer to an IPTV terminal when a transport stream according to the teachings of the present disclosure is delivered via IP multicast means.

Similarly, the terms like "client," "user," "viewer," "consumer," "subscriber," and other terms of similar import may be used interchangeably herein to essentially refer to an individual viewer—as opposed to all the users in a household—watching broadcast/multicast programs on a hybrid terminal. As above, the broadcast/multicast transport stream of the programs may be delivered to the hybrid terminal according to the teachings of the present disclosure, and the hybrid terminal may be configured as discussed below to process the received transport stream to provide highly personalized viewing experience to the viewer. For ease of discussion, the terms "program" and "channel", as in the case of a TV program or TV channel, may be used interchangeably herein as may be evident from the context.

Figure 2A:
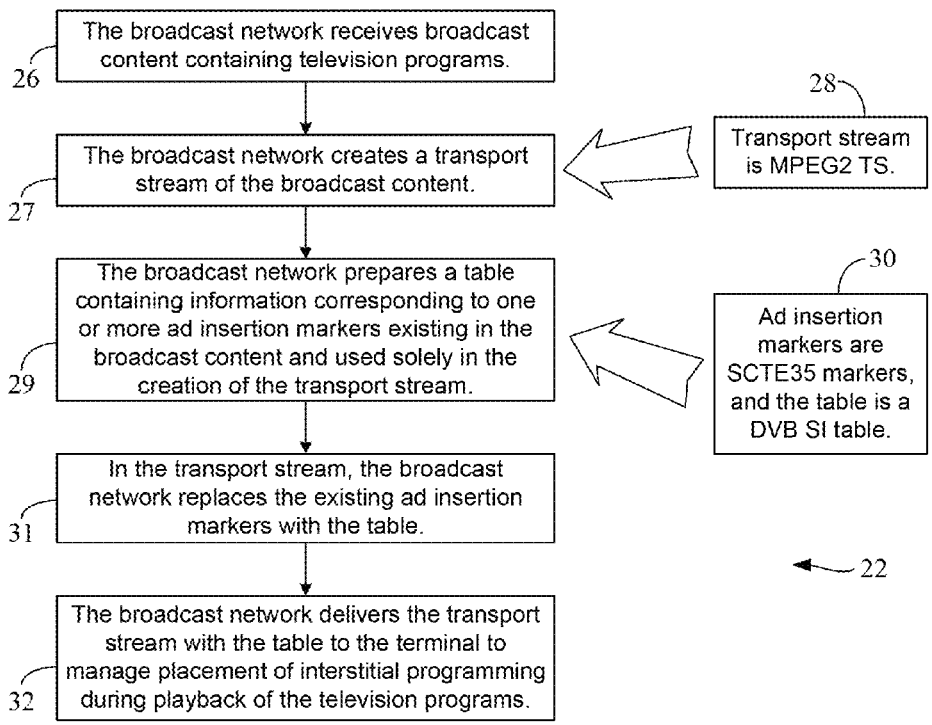
FIG. 2A is an exemplary flowchart depicting various steps that may be performed by a broadcast network according to one embodiment of the present disclosure.
Figure 3:
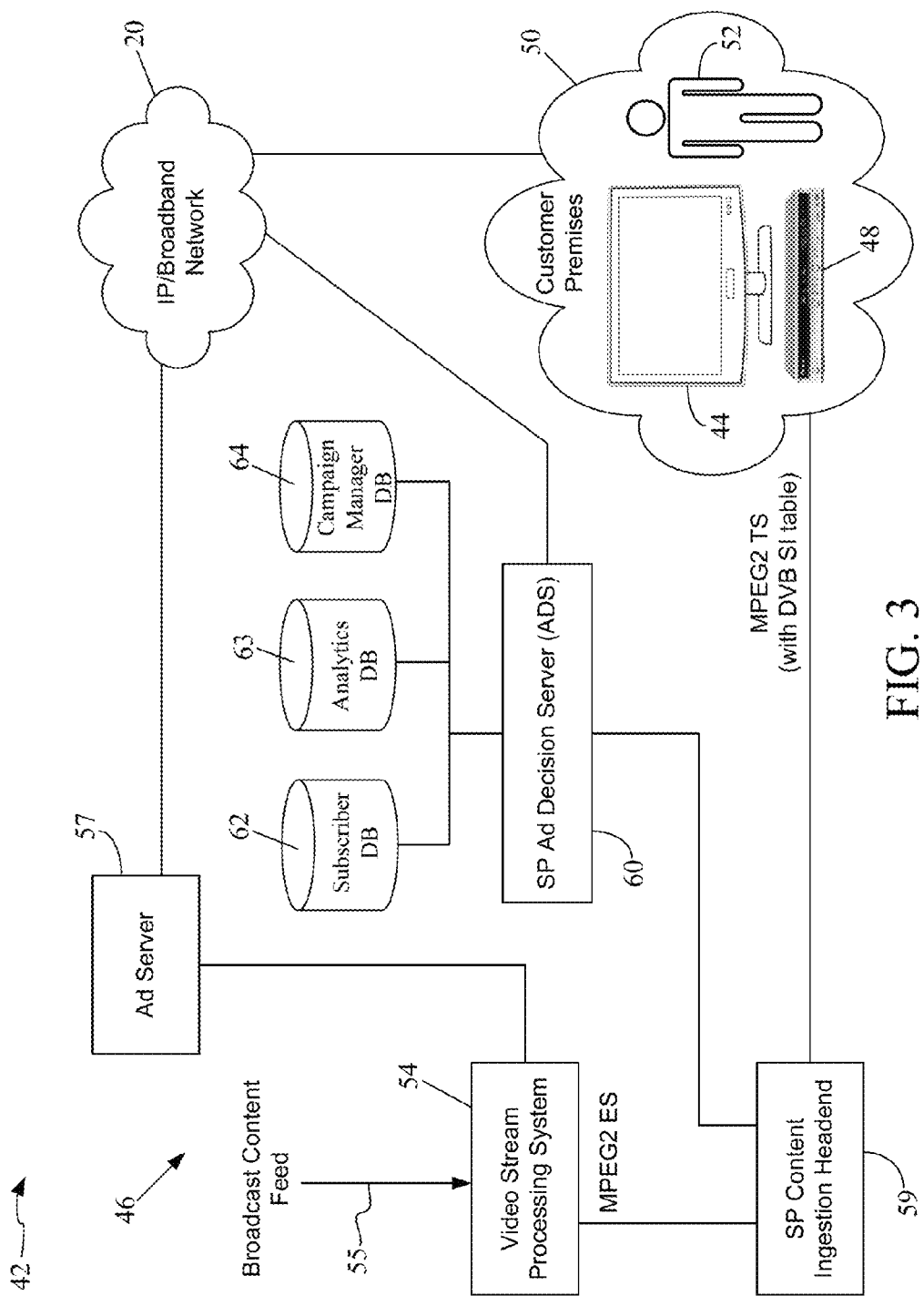
FIG. 3 illustrates exemplary details of a broadcast system for personalized ad insertion according to one embodiment of the present disclosure.

FIG. 2A is an exemplary flowchart 22 depicting various steps that may be performed by a broadcast/multicast network such as, for example, the broadcast network 46 in FIG. 3, according to one embodiment of the present disclosure. As discussed later, the broadcast network may signal interstitial programming to a terminal for playback to a viewer associated with the terminal. The terminal may be coupled to the television broadcast network to receive the broadcast content and signals therefrom. The terminal may be a hybrid terminal, an IPTV terminal, or a hybrid terminal with IPTV functionality. The interstitial programming may include commercial advertisements. Initially, as part of the signaling of interstitial programming, the broadcast network may receive a broadcast content containing television programs (block 26). The broadcast content may be received from, for example, live satellite broadcast video feed in the form of analog or digital channels. At block 27, the broadcast network may create a transport stream of the broadcast content. The transport stream may be the earlier-described MPEG2 TS, as noted at block 28. At block 29, the broadcast network may prepare a table containing information corresponding to one or more ad insertion markers existing in the broadcast content and used solely in the creation of the transport stream. As noted at block 30, in one embodiment, the ad insertion markers may be the previously-mentioned SCTE 35 markers, and the table prepared at block 29 may be a DVB SI table. As discussed in more detail below, such DVB SI table may be the ART mentioned earlier. In the transport stream, the broadcast network may replace the existing ad insertion markers with the table prepared at block 29, as mentioned at block 31. Thereafter, at block 32, the broadcast network may deliver the transport stream with the table (replaced at block 31) to the terminal to manage placement of interstitial programming during playback of the television programs.

Figure 2B:
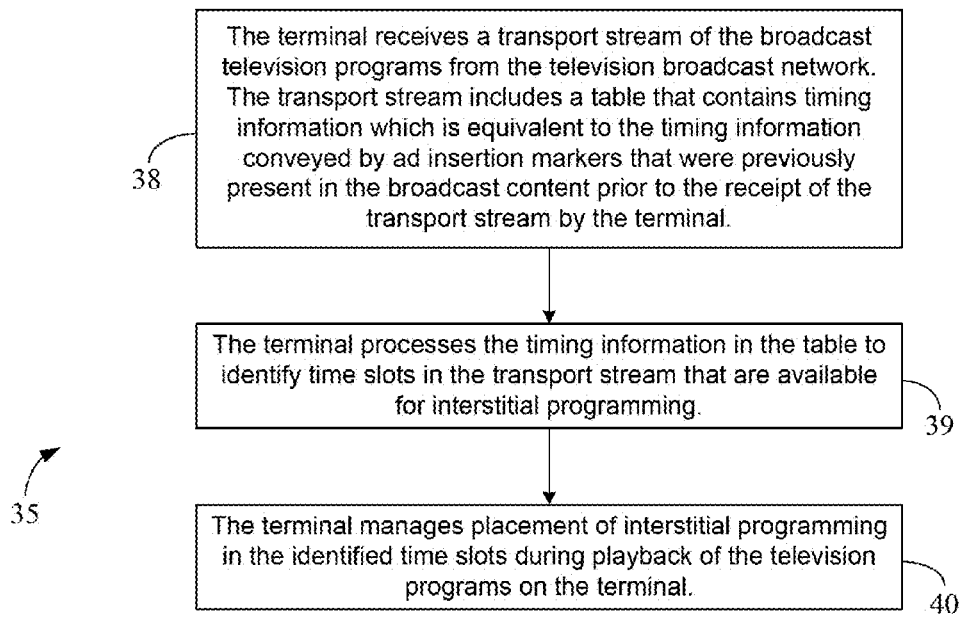
FIG. 2B is an exemplary flowchart depicting various steps that may be performed by a terminal according to one embodiment of the present disclosure.

FIG. 2B is an exemplary flowchart 35 depicting various steps that may be performed by a terminal such as, for example, the hybrid terminal 44 in FIG. 3, according to one embodiment of the present disclosure. Broadly speaking, the terminal-based steps in FIG. 2B may be considered as counterparts to the network-based actions depicted in FIG. 2A. For ease of depiction, the blocks similar to blocks 28, and 30 are not repeated in FIG. 2B, but it is understood that similar content remains applicable to block 38 in FIG. 2B. The terminal may present interstitial programming to a viewer in the manner illustrated in FIG. 2B. The terminal may be coupled to a television broadcast/multicast network that delivers broadcast/multicast television program to the terminal. Initially, at block 38, the terminal may receive a transport stream of the broadcast television programs from the television broadcast network. The transport stream may include a table such as, for example, the ART (discussed below), that contains timing information which is equivalent to the timing information conveyed by ad insertion markers that were previously present in the broadcast content prior to the receipt of the transport stream by the terminal. The terminal may process the timing information in the table received at block 38 to identify time slots in the transport stream that are available for interstitial programming (block 39). The terminal may then manage placement of interstitial programming in the identified time slots during playback of the television programs on the terminal (block 40).

It is noted here that FIGS. 2A and 2B provide a general outline of various steps performed by a broadcast network and a hybrid terminal, respectively, as part of the personalized ad insertion procedure according to particular embodiments of the present disclosure. A more detailed discussion of those and other aspects according to the teachings of the present disclosure is provided with reference to FIGS. 4-10 below.

More generally, the transport stream-based table mentioned in FIGS. 2A-2B provides a means by which an Ad Decision Server (ADS) may be signaled to an end user's terminal. The terminal can then request targeted ads from the ADS. Existing broadcast solutions do not use any interaction with user terminals in determining ad placements. As described in detail below, the user terminal can provide the ADS with end user identification information, which may be used by the ADS to obtain pre-stored personal preferences of the end user. The ADS may use available backend information along with user's personal preferences to select personalized ads for the user from amongst the available ads.

To enable the hybrid terminal to insert targeted ads in the linear broadcast program despite the absence of the SCTE 35 markers in the received transport stream, the transport stream-based table may also signal ad insertion points to the user's terminal. These ad insertion points indicate ad slots where any local/regional/national ad already placed in the broadcast TV program can be removed and replaced at the terminal by an end user-targeted ad. As noted earlier, in existing broadcast solutions, SCTE 35 marker-type indicators of ad insertion points are removed before the broadcast content's MPEG2 TS is sent to the user terminal. In one embodiment, an MPEG DASH based manifest may be delivered—via respective transport stream-based tables—to all terminals/STBs that are "tuned" to the channel in which the personalized ad insertion will occur. The content of the MPEG DASH manifest may describe the upcoming program breaks in which advertisement insertion can occur for that channel. For each upcoming ad insertion slot, the manifest may also contain information identifying one or more sources or advertising servers available to supply respective advertising material for the duration of the ad insertion slot. For each identified source, the manifest may also contain information about a source-specific delivery format for the respective advertising material. In one embodiment, the manifest may include URLs to advertising servers that will determine which advertisements are to be inserted in the upcoming program breaks. When processing these URLs, the terminal may provide some unique identifying information to an advertising server and, as mentioned earlier, the server can correlate such information with network-based advertising campaign information to provide a result to the user terminal. The result may include one or more advertisements that are personalized to the details associated with the user at that specific user terminal.

FIG. 3 illustrates exemplary details of a broadcast system 42 for personalized ad insertion according to one embodiment of the present disclosure. A hybrid terminal 44 is shown to be connected to a broadcast network 46 configured according to the teachings of the present disclosure and also to a broadband IP network such as, for example, the IP/broadband network 20 of FIG. 1. Thus, the hybrid terminal 44 in FIG. 3 operates under the same networked configuration as the hybrid terminal 17 in FIG. 1, except that the hybrid terminal 44 and the broadcast network 46 in FIG. 3 provide additional functionality to implement the teachings of the present disclosure and, hence, are different from the hybrid terminal 17 and the broadcast network 19 in FIG. 1. However, the hybrid terminal 44 and the broadcast network 46 support the general features of the hybrid terminal 17 and the broadcast network 19, respectively, discussed earlier and, hence, such discussion is not entirely repeated herein for the sake of brevity. For example, the hybrid terminal 44 may have different form factors such as, for example, an STB connected to a TV display, a smart TV, an HbbTV, a digital media player, a Blu-ray player, a video game console, a digital hotel television system, and so on. In the embodiment of FIG. 3, the hybrid terminal 44 may not only provide conventional television functionality through its connection to the broadcast network 46, but may also have integrated Internet and web access features to enable it to support delivery of online interactive media, Internet TV or IPTV, OTT content, as well as on-demand streaming media through its connection to the broadband network 20. Similarly, the broadcast network 46 may be, for example, a terrestrial or over-the-air broadcast TV network, a cable TV network, or a satellite TV network. The broadcast network 46 may be a fully digital network that supports a digital broadcast connection such as, for example, an ATSC, a DVB, or an ISDB based broadcast connection. The broadcast network 46 may deliver a transport stream as per teachings of the present disclosure via traditional broadcast means (terrestrial/satellite/cable means) or via IP multicast means. Hence, the terms "broadcast/multicast network" and "broadcast network" may be used interchangeably herein to refer to the broadcast network 46.

Figure 6:
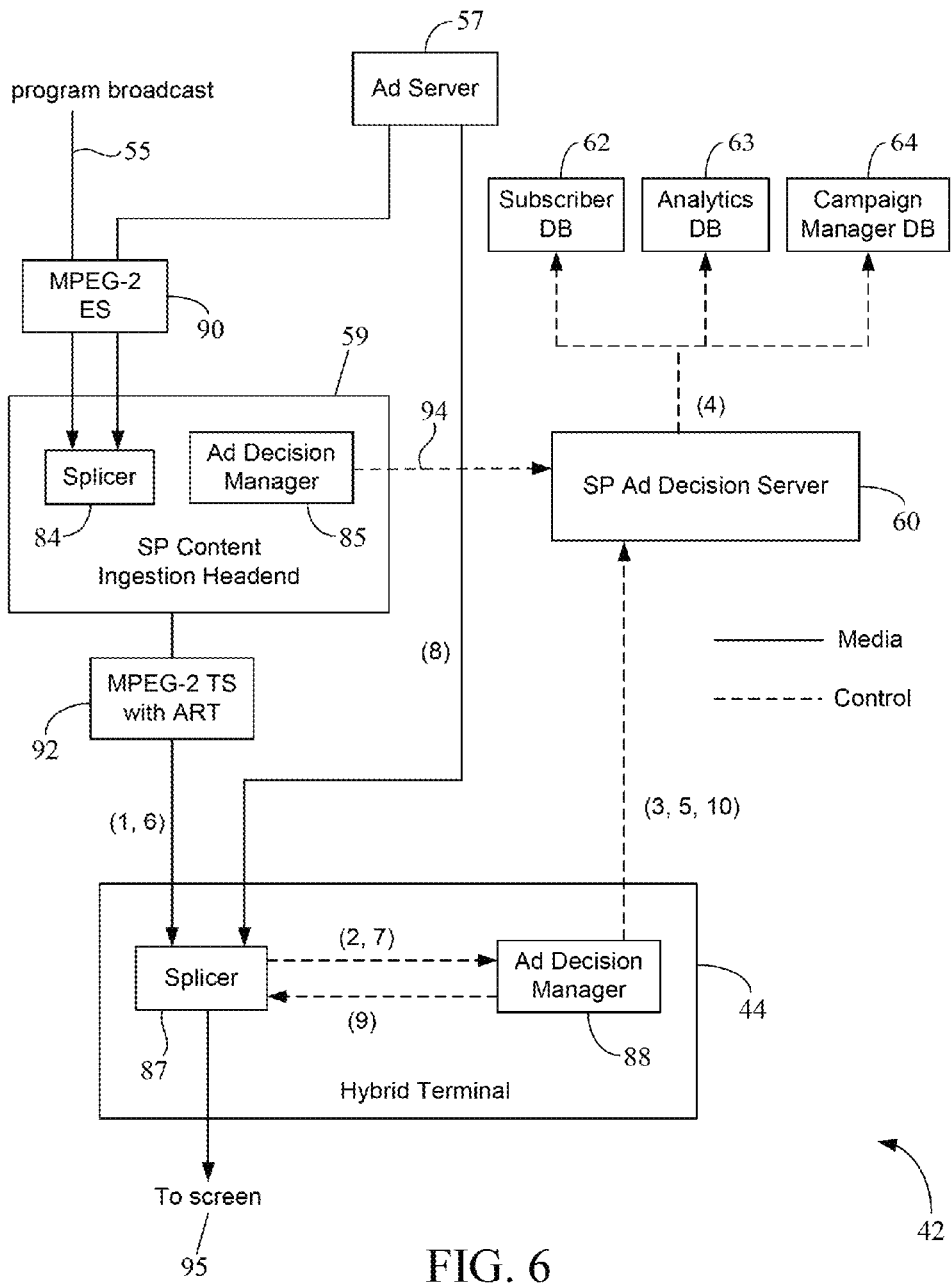
FIG. 6 depicts exemplary functional components and interactions therein for a group of system components shown as part of the broadcast system in FIG. 3.

In one embodiment, the hybrid terminal 44 may receive broadcast programming through a Set-Top Box (STB) 48, or, alternatively, the hybrid terminal 44 may itself include the functionality of the STB 48 as part thereof, in which case the terminal 44 may directly receive broadcast programming as shown, for example, in FIG. 6. In another embodiment, the combination of the STB 48 and the terminal 44 may be considered to comprise a "hybrid terminal," such as, for example, when the terminal 44 is a legacy TV that does not have smart TV functionality. Exemplary architectural details of the hybrid terminal 44 according to one embodiment of the present disclosure are provided in FIG. 11 (discussed later). The STB 48 may be a service provider-specific receiver of broadcasted content/signals and may also be referred to as a Customer Premises Equipment (CPE). In one embodiment, the STB 48 may be an IP-STB supporting IPTV multicast functionality for IP delivered channels. In one embodiment, the hybrid terminal 44 and/or the STB 48 may be capable of receiving audio-visual content through Radio Frequency (RF) signals and converting the received signals into signals that are compatible with an appropriate display device such as, for example, an analog/digital television or computer monitor. The hybrid terminal 44 may be capable of receiving cable-based as well as non-cable based audio-visual content. Such content may include, for example, Internet Protocol TV (IPTV) content, cable TV programming, satellite or other broadcast TV channels, Over-The-Top (OTT) streaming video from non-cable operators like Vudu and Netflix, Over-The-Air (OTA) live programming, Video-On-Demand (VOD) content from a cable service provider or a non-cable network operator, Time Shifted Television (TSTV) content, programming delivered from a Digital Video Recorder (DVR) or a Personal Video Recorder (PVR) or a Network-based Personal Video Recorder (NPVR), and so on. In one embodiment, the hybrid terminal 44 may operate in an IP-STB manner for an IP delivered channel such as, for example, an IPTV multicast channel. As noted before, for ease of discussion, the term "hybrid terminal" is primarily used herein to refer to a terminal that receives a transport stream from the broadcast network 46 as per teachings of the present disclosure—whether through traditional broadcast means or through IP multicast means.

The hybrid terminal 44 and/or the STB receiver 48 may be present at a location 50, also referred to as "customer premises". An exemplary user/viewer 52 is shown to be present at the location 50 and watching broadcasted programs on the hybrid terminal 44. The location 50 may be a home, a hotel room, a dormitory room, and the like. In certain embodiments, the viewer 52 may not be the owner/proprietor of the hybrid terminal 44, but can still receive personalized ads so long as the viewer 52 somehow conveys his/her personal user preferences and viewer-specific information to the television broadcast network 46. It is understood that there may be more users and more hybrid terminals at the customer premises 50, but only one of each is shown in FIG. 3 for ease of illustration. Also, as discussed below, only one such user 52 is identified to the television broadcast network so that advertisements are personalized solely towards the user 52 who is registered/logged-in to that specific hybrid terminal 44.

In one embodiment, the hybrid terminal 44 may communicate with the broadband IP network 20 using Transmission Control Protocol (TCP)/IP-based data communication. As noted before, the IP network 20 may be, for example, the Internet including portions of one or more wireless networks as part thereof. In one embodiment, the hybrid terminal 44 may communicate wirelessly with the broadband network 20, for example, through a wireless connection between a customer premises-based broadband access network (not shown) and the hybrid terminal 44.

In one embodiment, the broadcast network 46 may include a video stream processing system (VPS) 54 to provide an elementary stream, such as, for example, an MPEG2 Elementary Stream (ES), of the received broadcast content feed at arrow 55 and, optionally, of any advertising content received from an ad server 57. The VPS 54 may be coupled to (or in communication with), for example, a satellite receiver (not shown), which may receive live satellite broadcast video feed in the form of analog or digital channels from a satellite antenna (not shown). The received channels may be then delivered to customer premises via a service provider's cable network. Prior to processing the received live video data, the VPS 54 may communicate with the ad server 57 to obtain any local/regional/national ad to be inserted into the linear programming of the broadcast feed. In one embodiment, the ad server 57 may be part of the broadcast network 46. However, in another embodiment, the ad server 57 may be a separately-managed server providing ad content to the broadcast network 46, but not being part of the network 46.

In the embodiment of FIG. 3, the broadcast network 46 may also include a Service Provider (SP) content ingestion headend 59 and an SP Ad Decision Server (ADS). The service provider headend 59 may receive the elementary stream of the broadcast content from the VPS 54 and may generate a transport stream therefrom. The transport stream may be then delivered to the hybrid terminal 44, either directly or through the STB 48. In one embodiment, the transport stream may be an MPEG2 TS that includes a table such as, for example, the earlier-mentioned Ad Replacement Table (ART), which replaces the existing ad insertion markers, such as the SCTE 35 markers, but contains information corresponding to those replaced markers. In one embodiment, the VPS 54 may be coupled to a regional/national headend (not shown) in a broadcast network, in which case, the VPS 54 may itself receive a transport stream of the broadcast content with SCTE-35 markers included and provide that transport stream to the local SP headend 59, which may then create and deliver the MPEG2 TS with ARTs (replacing the SCTE35 markers) to the hybrid terminal 44. The generation of the MPEG2 TS with an ART is discussed in detail below with reference to discussion of FIGS. 4-7. In one embodiment, the ART may include an MPEG DASH manifest to provide timing information to the hybrid terminal for ad replacement, as discussed in more detail below with reference to FIGS. 8-10. It is observed here that the embodiment of FIG. 3 illustrates that the headend 59 in the broadcast network 46 delivers the MPEG2 transport stream via traditional broadcast means (terrestrial/satellite/cable means). However, in another embodiment, the headend 59 may deliver the MPEG2 TS to the customer premises 50 via IP multicast means such as, for example, an IPTV multicast channel delivered to the hybrid terminal 44 through the IP broadband network 20. Thus, although the discussion of FIGS. 4-10 below primarily refers to the traditional broadcast-based embodiment of FIG. 3, it is understood that all such discussion equally applies to embodiments where the broadcast network 46 delivers a transport stream—configured as per teachings of the present disclosure—via IP multicast means. Hence, a separate IP multicast-based discussion is not provided herein for the sake of brevity.

It is known that current digital broadcast television systems are based on the MPEG transport stream standard. The MPEG2 TS is a standard format for transmission and storage of audio, video, and Program and System Information Protocol (PSIP) data, and is used in broadcast systems such as DVB, ATSC, and ISDB. Transport stream specifies a container format for encapsulating the packetized elementary stream content, with error correction and stream synchronization features for maintaining transmission integrity when the signal is degraded. Transport streams are designed to tolerate less reliable transmissions, such as terrestrial or satellite broadcasts. A transport stream may carry multiple programs or "channels," as shown, for example, in FIGS. 7A-7C discussed later.

As shown in FIG. 3, the SP headend 59 may be operatively coupled to the SP ADS 60. In the absence of a personalized ad for an ad slot, the SP ADS 60 may provide guidance to the SP headend 59 regarding which advertisement to place in the MPEG2 TS being delivered to all the terminals. The ADS 60 may have access to one or more databases such as, for example, a subscriber database (DB) 62, an analytics DB 63, and a campaign manager DB 64. In one embodiment, these databases 62-64 may be part of the broadcast network 46 as well. In certain implementations, these databases 62-64 may be servers or server-based data storage systems. The subscriber DB 62 may store user-specific personal information of the user 52. Such personal information may include, for example, the user's personal viewing preferences, the user's age, gender, and other personal interests the user may have shared with the service provider. The analytics DB 63 may store demographic information as well as more dynamic information related to the user's previous viewing activity, what others with similar interests watched in the past, and so on. The campaign manager DB 64 may store information related to currently ongoing ad campaigns to assist the ADS 60 in selecting the most personalized ad(s) that matches with the user's preferences from the currently active ad campaigns.

As shown in FIG. 3, in one embodiment, the servers 57, 60 in the broadcast network 46 may be connected to the IP/broadband network 20 and, hence, accessible to the hybrid terminal 44 via the IP network 20. Additional operational details of various entities shown in the exemplary broadcast system 42 are provided later below in conjunction with discussion of FIGS. 4 and 6.

In one embodiment, the broadcast network 46 may be a service provider's network and the network components 54, 57, 59-60, and 62-64 may be owned, managed, or operated by the service provider, such as, for example, a cable TV service provider or a satellite network operator. In another embodiment, only a portion of the broadcast network 46 may be Service Provider (SP) owned, managed or operated. Such portion may include, for example, the SP headend 59 and the SP ADS 60. Other network components in the broadcast network 46 may be controlled, managed, or operated by more than one commercial entities. Other similar or alternative commercial arrangements may be envisaged for ownership, operation, management, or support of various component systems shown in FIG. 3. In any event, all of the business entities associated with the broadcast network 46—through ownership, management, or control of one or more network servers or databases—may have appropriate licensing or operating agreements therebetween to enable smooth/seamless provisioning of personalized ads or other interstitial programming to the subscriber 52. Generally, who owns or manages a specific system component shown in FIG. 3 is not relevant to the overall personalized content delivery solution discussed in the present disclosure.

Figure 11:
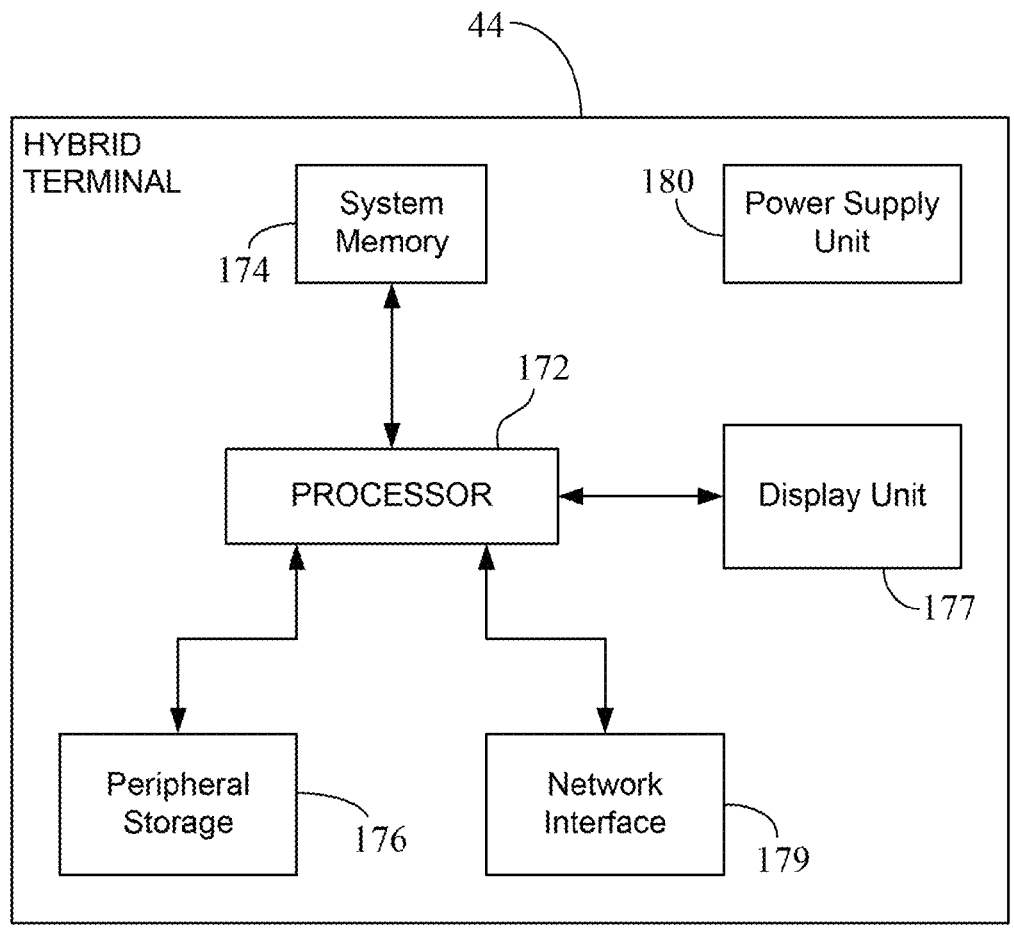
FIG. 11 is a block diagram of an exemplary hybrid terminal according to one embodiment of the present disclosure.

It is noted here that exemplary architectural details of the hybrid terminal 44 are shown in FIG. 11 and discussed later below. However, for ease of illustration and sake of brevity, no such architectural details are provided for the remaining processing entities 48, 54, 57, 59-60, and 62-64 shown in the embodiment of FIG. 3. It is understood, though, that at least some of these remaining entities, such as, for example, the servers 57 and 60, may have a similar architectural configuration in particular embodiments. In certain other embodiments, each of the entities 48, 54, 57, 59-60, and 62-64 may include a respective memory (not shown) to store the program code to carry out the relevant entity-specific processing steps discussed below. An entity's processor(s) (not shown) may invoke/execute that program code to implement the desired functionality. For example, in one embodiment, upon execution by a processor (not shown) in the ad server 57, the program code in the ad server 57 may cause the ad server 57 to supply ads requested by the hybrid terminal 44. Similarly, one or more processors in the ADS 60 may execute relevant program code to carry out the database-querying aspect discussed with reference to FIG. 4 below. In summary, the processing entities 48, 54, 57, 59-60, and 62-64, or any other processing entity not shown in FIG. 3 but may be needed to effectuate the personalized advertising according to teachings of the present disclosure, may be configured (in hardware, via software, or both) to carry out the relevant entity-specific processing steps discussed below. Thus, although the processing entities 48, 54, 57, 59-60, and 62-64 may be referred to herein as "performing," "accomplishing," or "carrying out" a function or process, it is evident to one skilled in the art that such performance may be technically accomplished in hardware and/or software as desired.

In one embodiment, a service provider—whether a cable network operator, satellite broadcast service provider, or any other entity—may offer a subscription-based, non-subscription based, or free service to deliver targeted content to a hybrid terminal through a modified transport stream discussed below. The service provider's servers or databases may be accessible to the user's hybrid terminal through a broadband network. In particular embodiments, such service provider may supply the DVB SI tables through an MPEG2 TS, as discussed below, to enable the user's hybrid terminal to download appropriate advertisements from a content server, which may or may not be owned/operated/managed by the service provider. Thus, various functionalities discussed in the present disclosure may be offered as a commercial or non-commercial service.

Figure 4:
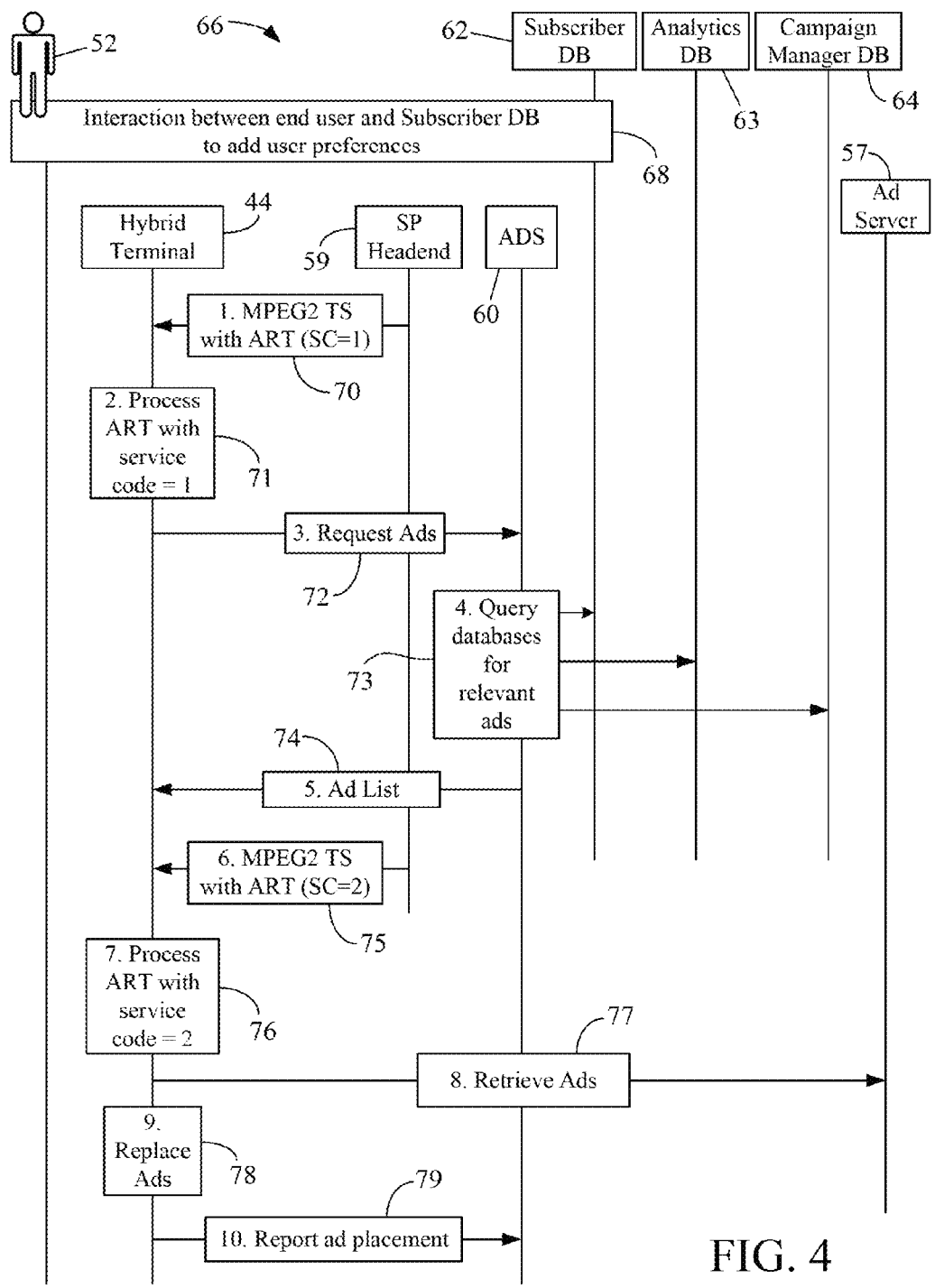
FIG. 4 shows an exemplary call flow for personalized ad insertion at a hybrid terminal according to one embodiment of the present disclosure.

FIG. 4 shows an exemplary call flow 66 for personalized ad insertion at a hybrid terminal, such as the hybrid terminal 44 in FIG. 3, according to one embodiment of the present disclosure. A pre-requisite to facilitate personalized advertising is that the end user 52 may need to provide user-specific information to the service provider. The user-specific information may include, for example user's age, gender, as well as user's personal viewing preferences such as, for example, favorite genres, interests, hobbies, shows, and the like. The user may provide his/her personal information in as much detail as desired. The value of personalization lies in the user trusting the service provider sufficiently so as to provide an accurate view of the user's preferences to the service provider, thereby ensuring, as compensation, that the inevitable advertisement slots in the broadcasted transport stream are populated with appropriate personalized content. This aspect is depicted by block 68 in FIG. 4 where it is noted that the user 52 may interact with the subscriber DB 62 to add user preferences. In one embodiment, the user 52 may use the hybrid terminal 44 or other web-enabled device such as, for example, a computer or a tablet, to access the subscriber DB through the ADS 60 via the broadband network 20. In another embodiment, the user 52 may provide his/her preferences at the time of signing up for the SP's services and as part of setting up his/her subscriber account with the SP. However, in the context of the present disclosure, how such user-specific information is provided to the SP and stored in the subscriber DB 62 is not relevant. In any event, it is observed that, in one embodiment, the service provider may assign a User ID to the user 52 or allow the user 52 to select a User ID, which may be needed by the user's hybrid terminal 44 to receive personalized ads as discussed below. The selected or assigned user ID may be stored in the subscriber DB 62 as part of subscriber account information for the user 52.

Before discussing the numbered steps 1 through 10—identified by reference numerals 70-79 in FIG. 4, it is noted that this numbering is provided for ease of discussion only; it does not imply that these steps must be performed in the described order in all the embodiments of the present disclosure. Also, in certain embodiments, one or more steps may be combined, altered, or omitted, or additional steps may be present, as per desired implementation.

Figure 5:
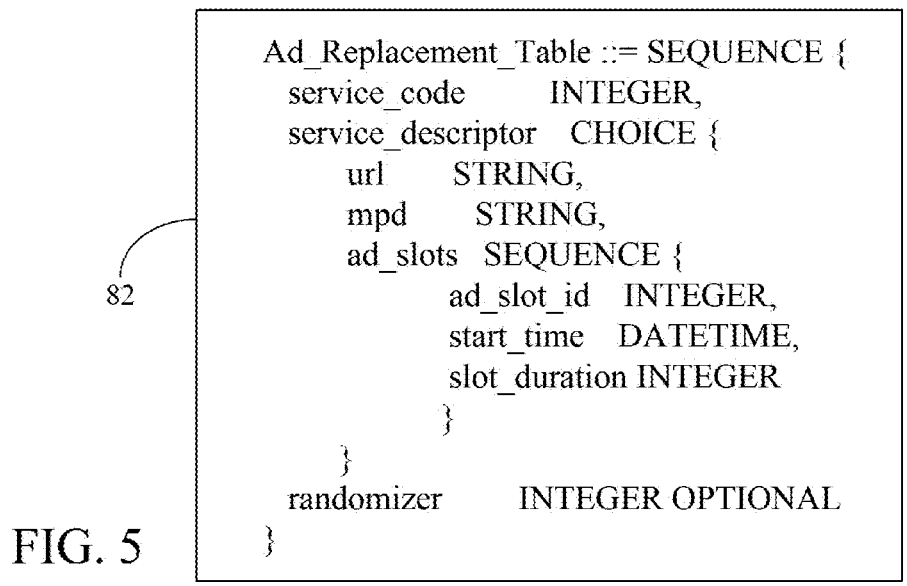
FIG. 5 is an example of the syntax/format of an Ad Replacement Table (ART) according to one embodiment of the present disclosure.

In step-1 (block 70), following the well-established practice of the broadcast industry, the SP's headend 59 may create a transport stream, such as the MPEG2 TS, of the broadcast content feed, such as the MPEG2 ES received from the VPS 54. Initially, the MPEG2 TS may contain ad insertion markers such as, for example, the SCTE 35 markers, which are used solely in the creation of the transport stream, as shown, for example, in FIG. 7A (discussed later). In one embodiment, the headend 59 may insert an ART—an example of which is shown in FIG. 5 and discussed later below—into the transport stream. This ART is to prepare the hybrid terminal for the subsequent insertion of personalized advertisements. In one embodiment, the SP headend 59 may populate the initial/first ART with a specific indication to indicate to the hybrid terminal 44 that the ART in the MPEG2 TS contains the Uniform Resource Locator (URL) for the SP's ADS 60. In one embodiment, this indication may be a Service Code (SC) field having a value of "1." The ADS 60 may function as a reverse proxy, hiding any SP backend server topology. The URL may enable the terminal 44 to contact the ADS 60 for advertisements, as discussed below.

As noted earlier, the SP headend 59 will, following normal industry practice, eventually remove the earlier-inserted SCTE 35 markers before sending the MPEG2 TS to the client terminal 44. However, prior to removal of the markers, the headend 59 may insert appropriate local/regional ads for the SP's broadcast region at the timing locations in the MPEG2 TS identified by the SCTE 35 markers. These may be the default ads to be shown to the user 52 in case the user does not subscribe to personalized ad insertions, for example, by not providing user-specific personal information to the service provider or, for some reason, there is no user-specific personalized ad available. In one embodiment, such default ads may be selected with "assistance" from the SP ADS 60, or they may be the ads that are already provided by the ad server 57 through the MPEG2 ES. In case of default ads, in one embodiment, the MPEG2 TS delivered to the hybrid terminal 44 may not contain any ART which references such default ads.

In the embodiment of FIG. 4, as indicated at block 70, the headend 59 may deliver the transport stream with the table—here, an ART with SC=1—to the hybrid terminal 44. As discussed below, the table also enables the hybrid terminal to obtain information about the source(s) from which personalized ads may be fetched for insertion into those slots.

In step-2 (block 71), while receiving the MPEG2 TS from the headend 59, the hybrid terminal 44 may encounter the ART with service_code=1 (SC=1). In response, the terminal 44 may process the ART and retrieve the URL contained therein. The terminal 44 may then augment the retrieved URL by appending it with identifying information for the user logged-in or registered on the terminal 44 as well as, optionally, the device ID of that terminal. In one embodiment, when the user 52 watches a particular TV channel that offers a subscription (or non-subscription) TV session for personalized viewing, a log-in option may be presented to the user 52 through the hybrid terminal 44. Upon "logging in" to the available TV session, the user 52 may be requested to provide his/her User ID for such a TV session, if the user is interested in receiving personalized interstitial programming. As noted earlier, the SP may assign or allow the user to select a User ID when the user "signs up" for the personalized advertising option. In one embodiment, the information with which the hybrid terminal 44 appends the retrieved URL may be a hash of this User ID. In another embodiment, as noted before, the appended information may include the User ID along with a device identifier (device ID) of the hybrid terminal 44. The device ID may be, for example, the Media Access Control (MAC) address of the terminal 44. It is noted here that the use of an optional randomizer value in the ART as shown, for example, in FIG. 5 and discussed later below, may prevent multiple hybrid terminals from flooding the ADS 60.

In step-3 (block 72), the hybrid terminal 44 may dereference this augmented URL using an HTTP GET request. In one embodiment, the terminal 44 may send its HTTP GET request to the ADS via the IP broadband network 20. As part of the HTTP GET request, the terminal 44 may use an XML HTTP Request (XHR) (where "XML" refers to Extensible Markup Language) technique or another equivalent mechanism to send a request for ads to the ADS 60. The action at block 72 may be done in the background without any user interaction or without affecting the user's viewing experience.

In step-4 (block 73), the ADS 60 may query, as appropriate, one or more of the databases 62-64 to determine what might be the best ad placements for this particular user. It is noted that the subscriber DB 62 contains the end user's ad viewing preferences, which may have a major role in determining any ad placement decision by the ADS 60. For example, the ADS 60 may use the stored viewer-specific information to select one or more viewer-specific personalized advertisements to be sent to the hybrid terminal for playback to the viewer. In that regard, the ADS 60 may compare the User ID received from the hybrid terminal with the stored viewer-specific information in the subscriber DB 62 to first determine that the user ID received from the hybrid terminal indeed matches with a user ID stored in the DB 62 as part of the viewer-specific information. Thereafter, the ADS 60 may query one or more of the databases 63-64 to obtain information about appropriate viewer-specific ads that can be sent to the hybrid terminal 44 for playback to the viewer 52. In any event, for the present disclosure, it is not relevant which algorithm the ADS 60 uses to determine appropriate ads for the viewer 52, or how the contents of these databases 62-64 are weighted/analyzed for selection of such ads, or the heuristics the decision server 60 may use to select ads based on the end user's preferences from amongst the ads available. The ADS 60 can use any backend information combined with the end user's personally-selected preferences to arrive at the most suitable ads for the user.

In step-5 (block 74), the ADS 60 may send a result of its query (at block 73) to the hybrid terminal 44. This result may be sent as an HTTP response (to the request at block 72) via the broadband network 20. In one embodiment, the result may contain a list of URLs of ads contained on ad content servers—like the ad server 57—for the most applicable ad content. In one embodiment, the list at block 74 may include a respective ad-specific URL for each viewer-specific personalized ad that may be sent to the hybrid terminal 44 and supporting metadata for each such ad. The metadata may include, for example, information about duration of the viewer-specific ad. As noted, each ad-specific URL identifies a respective content server, such as the ad server 57, from which a corresponding viewer-specific personalized ad is to be retrieved by the hybrid terminal 44.

In step-6 (block 75), the SP headend 59 may populate another ART with information corresponding to the SCTE 35 markers to identify ad insertion points to the hybrid terminal 44. The SP headend 59 may prepare this second ART with a different indication, and send that table to the hybrid terminal 44—through the MPEG2 TS being delivered to the terminal 44—to notify the hybrid terminal 44 of available ad insertion slots coming up within the MPEG2 TS. This other ART may be a second ART populated with a different indication such as, for example, a service_code field having a value of "2" (SC=2), as shown in the exemplary embodiments of FIGS. 7B-7C (discussed later). This second ART thus enables the hybrid terminal 44 to select— from the ad list received at block 74—at least one viewer-specific personalized advertisement that may be time-wise possible for a specific ad insertion slot coming up within the transport stream. The ART (with SC=2) at block 75 may be delivered via the MPEG2 TS a short period of time before the respective ad insertion point to allow the hybrid terminal 44 to make the necessary broadband connections needed to retrieve the ads and establish any buffering to ensure a smooth splicing of the personalized ad.

Collectively, the ARTs at blocks 70, 75 enable the hybrid terminal 44 to manage placement of interstitial programming during playback of the television programs carried in the transport stream. Thus, the present disclosure effectively compensates the traditional removal of SCTE-35 ad insertion markers by providing a table in the transport stream that contains information corresponding to those removed markers, thereby enabling the hybrid terminal to determine timing of upcoming ad insertion slots In step-7 (block 76), the hybrid terminal 44 may process the incoming ART in the TS containing ad replacement opportunities, which are indicated by SC=2 in the ART. Through this processing, the time slots for the possible ads that could be associated with an ad insertion point may be notified to a local ad splicer in the terminal 44. An exemplary local ad splicer 87 is shown in FIG. 6, which is discussed later below.

In step-8 (block 77), using its broadband connection, the hybrid terminal 44 may retrieve/fetch the personalized ad(s) from one or more ad content servers using the URLs obtained in step-5 (block 74). The Ad Server 57 in FIGS. 3-4 and 6 is an example of such content servers; additional ad servers or content servers are not shown for the sake of simplicity. It is observed here that, in one embodiment, the ART at block 75 may indicate the total time available for the ad placement, and based on this information, a local Ad Decision Manager (ADM) may use its internal selection algorithm to choose one or more ads from those retrieved to fill the available time slot. As noted before, information about duration of a viewer-specific ad may be reported as part of the ad list at block 74, and this information may be used by the local ADM to determine which ad(s) may be time-wise possible for insertion into the available time slot. An exemplary local ADM 88 is shown in FIG. 6, which is discussed later below.

In step-9 (block 78), the ad(s) retrieved at block 77 may be inserted by the terminal's ad splicer into the appropriate place in the transport stream, thereby replacing the local or regional or national ad placed there by the SP or the originating broadcaster.

In step-10 (block 79), using its broadband connection, the hybrid terminal 44 may report the ad placement at block 78 to the ADS 60 whose URL is already received by the terminal 44 in step-1 (block 70). This step may be optional in certain embodiments. In one embodiment, the ADS 60 may forward this report of the ads placed to any appropriate entity within the broadcast network 46 or external to the broadcast network 46 for further analysis and record-keeping. Such entity may include, for example, the analytics DB 63 or an external server (not shown) that may correlate/ analyze the user's pre-reported viewing preferences vis-à-vis the personalized ads shown to the user, possibly to further improve personalization.

In one embodiment, the step-8 (block 77) may be modified to retrieve all the ads identified by the list of URLs at block 74. The ads may be cached in the hybrid terminal 44. As the ad insertion slots are identified by ARTs with SC=2 (as shown, for example, in FIGS. 7B-7C), the ads may be placed sequentially in the available ad slots. The hybrid terminal 44 may cycle through the cached ads until the SP instructs the cache to be cleared. In one embodiment, the SP may trigger a refresh of the ad results or ad cache in the hybrid terminal 44 by sending an updated ART with a service_code=1, which indicates to the terminal 44 that the updated ART contains a URL pointing to the ADS 60. This action may be similar to step-1 (block 70) and may prompt the terminal 44 to contact the ADS 60 for an updated ad list. In this manner, the personalized ads may remain timely with respect to any ongoing ad campaigns and may also benefit from additional analytics data.

In one embodiment, if the initial HTTP request (with the user ID) to the ADS 60 in step-3 (block 72) does not return any or enough personalized ads in step-5 (block 74), then the hybrid terminal 44 may continue to display the local or regional ads already present in the broadcasted program being received through the transport stream. As mentioned earlier, there may not be any or enough personalized ads for the user 52 if the user does not subscribe to personalized ad insertions, for example, by not providing user-specific personal information to the service provider or, for some reason, there is no ad available that matches the user's personal preferences.

It is observed here that even when there are multiple hybrid terminals in a subscriber household showing the same program to associated viewers, these viewers will not receive the same set of advertisements if they have subscribed to personalized advertising. Each such viewer will receive user-specific personalized ads because the augmented URL at step-3 (block 72) will be unique for each user because of the presence of individual User ID and individual device ID (of the hybrid terminal associated with the user) therein. Thus, each request for ads in step-3 will be uniquely user-specific. As a result, each user-specific terminal will receive corresponding personalized ad list for the respective user from the ADS 60 in step-5 (block 74).

FIG. 5 is an example of the syntax/format of an Ad Replacement Table (ART) 82 according to one embodiment of the present disclosure. The table 82 shows an indicative representation—using an Abstract Syntax Notation One (ASN.1) type syntax—of the data to be carried in a transport stream-based ART (which may be a DVB SI table as noted before) delivered by the broadcast network 46 to the hybrid terminal 44 according to particular embodiments of the present disclosure. The ART 82 may be carried in a Packet Identifier (PID) whose value may be defined outside the standardized values currently assigned in the earlier-mentioned ANSI/SCTE 35 standard, titled "Digital Program Insertion Cueing Message for Cable" (2013). Currently, a PID is a unique 13-bit value used to identify the type of data stored in the packet payload. The DVB or another organization such as ATSC or ISDB may assign a standard value to this table 82 for industry-wide usage. It is noted here that, in one embodiment, the DVB SI-based table 82 is merely an example of a transport stream-based table as per teachings of the present disclosure. The solution according to the present disclosure is not specific to DVB-based broadcast networks. A table similar to the table 82 may be configured for other broadcast standards such as ATSC and ISDB to provide timing information to hybrid terminals receiving broadcast content/signals in broadcast networks based on those standards.

Each ART 82 being sent to the hybrid terminal 44 may contain one of the three choices—(i) the URL string of the ad decision server or MPEG DASH manifest (discussed later with reference to FIGS. 8-10); or (ii) the actual MPEG DASH manifest (referred to as "mpd" in FIG. 5); or (iii) the ad_slots sequence. When the service_code field has the value "1" (SC=1), the service_descriptor field contains the first choice—namely, the URL of a decision server, such as the SP's ADS 60. The randomizer field also may be present in the ART 82 when SC=1. On the other hand, when SC=2, the randomizer field may not be present in the table being delivered to the hybrid terminal. When the service_code field has the value "2" (SC=2), the service_descriptor field contains the third choice—namely, the ad_slots sequence, which specifies a sequence of the ad slots available for ad insertion and associated with the timeline of the broadcasted program currently being viewed by the user 52. In the ART 82, the start_time field for an ad slot may be a timestamp that reflects a frame-accurate point for the respective ad slot in the broadcasted program being delivered through the MPEG2 TS. The ad slot may be identified using the ad_slot_id field. The slot_duration field may be an integer representing the duration of the ad slot in seconds. In one embodiment, the randomizer field may be optional. The randomizer field may have an integer value expressing the number of seconds of delay that each hybrid terminal receiving the ART 82 may need to calculate—in tenths of seconds—that is less than a pre-determined randomizer window size. Once the calculated delay exceeds the pre-determined randomizer time window, a hybrid terminal may be then allowed to perform the HTTP GET request at step-3 (block 72) in FIG. 4. This requirement may prevent the HTTP server, such as the ADS 60, processing the ad decision requests from getting overloaded with a massive burst of requests from all the hybrid terminals receiving the same ART, for example, as a result of their respective viewers watching the same broadcast program/channel whose TS contains the ART. On the other hand, when the service_code field has the value "3" (SC=3), the service_descriptor field contains the second choice, namely the string representation of the MPEG DASH manifest which depicts the upcoming ad splice points. Furthermore, when the service_code field has the value "4" (SC=4), the service_descriptor field contains the first choice, namely the URL which the hybrid terminal 44 can dereference to obtain an MPEG DASH manifest which depicts the upcoming ad splice points. In one embodiment, when the service_code contains the values "3" or "4", the manifest stored in the "mpd" field or fetched by resolving the url field, respectively, complies with the semantics illustrated in FIG. 10.

FIG. 6 depicts exemplary functional components and interactions therein for a group of system components shown as part of the broadcast system 42 in FIG. 3. For ease of discussion, the same system components in FIGS. 3 and 6 are identified using the same reference numerals. As shown in FIG. 6, the SP headend 59 may include a splicer 84 and an Ad Decision Manager (ADM) 85, whereas the hybrid terminal 44 may also include a corresponding local splicer 87 and a local ADM 88. A splicer may process an incoming audio-visual program content stream—whether ES or TS—and splice the stream at ad insertion points to insert appropriate ads under the "guidance" of the respective ADM. In one embodiment, the ADM functionality may be implemented as part of the respective splicer. An MPEG2 ES block 90 may represent the functionality of the VPS 54, whereas an MPEG-2 TS block 92 may represent the transport stream that is delivered to the hybrid terminal 44 with ARTs defined according to particular embodiments of the present disclosure. The numbers in the parentheses correspond to the numbered steps shown in FIG. 4 and discussed earlier. For example, the ad retrieval step-8 in FIG. 4 is shown by a solid arrow from the ad server 57 to the local splicer 87 in the hybrid terminal 44, interactions between the hybrid terminal 44 and the ADS 60 at steps 3, 5, and 10 in FIG. 4 are indicated by a broken arrow from the ADM 88 in the terminal 44 to the ADS 60, the database querying step-4 is shown by multiple broken arrows from the ADS 60 to the databases 62-64, and so on. In FIG. 6, the unbroken or solid lines/arrows are used to illustrate media (or program/advertisement content) flow between two functional components, whereas the broken lines/arrows illustrate flow of control signals between two functional components. Thus, for example, the internal processing steps 2, 7, and 9 in FIG. 4 are shown by broken arrows internal to the terminal 44, whereas the broadband-based ad retrieval step-8 is shown by a solid arrow from the ad server 57 to the local splicer 87. The local splicer 87 may insert the retrieved ads at appropriate time slots within the received MPEG2 TS (block 92). Similarly, as symbolically illustrated by broken arrow 94, the splicer 84—in the role of the ADM 85—may query the ADS 60 for appropriate advertisements to be placed at ad insertion points indicated by corresponding SCTE 35 markers before the markers are removed from the MPEG2 TS. These ads may function as "default ads" in the absence of personalized ads, as discussed earlier. Similarly, the ADM 88 may consult the ADS 60 for appropriate personalized ads to be retrieved by the splicer 87 at step-8 in FIG. 4, and may then instruct the splicer 87 to perform the ad replacement step-9 in FIG. 4. The splicer 87 may then send the inserted ad for playback to the viewer on the hybrid terminal's screen, as indicated at arrow 95. For the sake of brevity, additional discussion of FIG. 6 is not provided in view of the detailed discussion of FIGS. 3-4.

It is noted here that the SP headend 59 is an example of a network entity in FIGS. 3-4 and 6 that may be configured to perform insertion of an ART—which may be a DVB SI table in one embodiment—in the MPEG2 TS. Generally speaking, the present disclosure contemplates a broadcast/multicast network-based action of replacing the existing ad insertion markers in the transport stream of broadcast/ multicast content with a table containing information corresponding to the timing information conveyed by such markers. The specific network entity or functional unit performing such replacement and/or delivering the table-containing transport stream to a hybrid terminal may vary from one implementation to another.

Figure 7C:
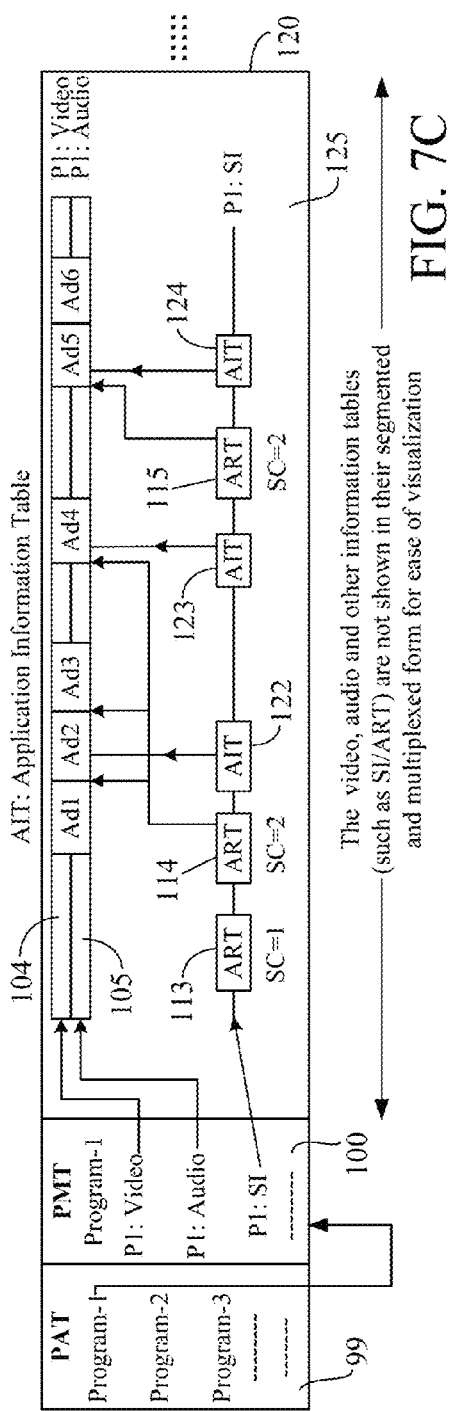

FIGS. 7A-7C illustrate how ARTs may be sent via an MPEG2 TS according to particular embodiments of the present disclosure. FIG. 7A shows an MPEG2 TS 97 including two Program Specific Information (PSI) tables—a Program Association Table (PAT) 99, and a Program Map Table (PMT) 100. The TS 97 is also shown with the broadcasted TV content portion/transport stream 102 for one of the programs—here, Program-1—mentioned in the PAT 99. As is known, a PAT lists all programs available in the transport stream. Each of the listed program may have an associated Packet Identifier (PID) value for its PMT. Thus, PMTs contain information about programs listed in the PAT. There may be one program-specific PMT for each program listed in the PAT. For example, an exemplary PMT for Program-1 (or P1) in the PAT 99 is shown using reference numeral "100" in FIG. 7A. The PMTs provide information on each program present in the transport stream, including the program number, and list the elementary streams that comprise the described MPEG2 program. For example, the PMT 100 for Program-1 indicates and the TS content portion 102 shows that P1 contains a video stream (P1: Video) 104, an audio stream (P1: Audio) 105, and SCTE 35 markers 107-109, among other content. In the illustration of FIG. 7A, the ad insertion marker 107 identifies time slots or ad insertion points for advertisement blocks "Ad2" and "Ad3", the marker 108 identifies time slot for the ad block "Ad4," and the marker 109 identifies the ad insertion point for the ad block "Ad5." As noted earlier, these markers 107-109 may be used by a headend, such as the SP headend 59 in FIG. 3, solely in the creation of the transport stream 102 for Program-1 to indicate advertising opportunities within the broadcasted TV program. The markers in transport stream 102 indicate that Ad 2, Ad 3, Ad 4 and Ad 5 may be replaced by a downstream node. As also noted earlier, these existing markers 107-109 are typically removed by the headend before the TS 97 is delivered to a hybrid terminal, such as the hybrid terminal 44 in FIG. 3, in a conventional television broadcasting system.

Figure 8:
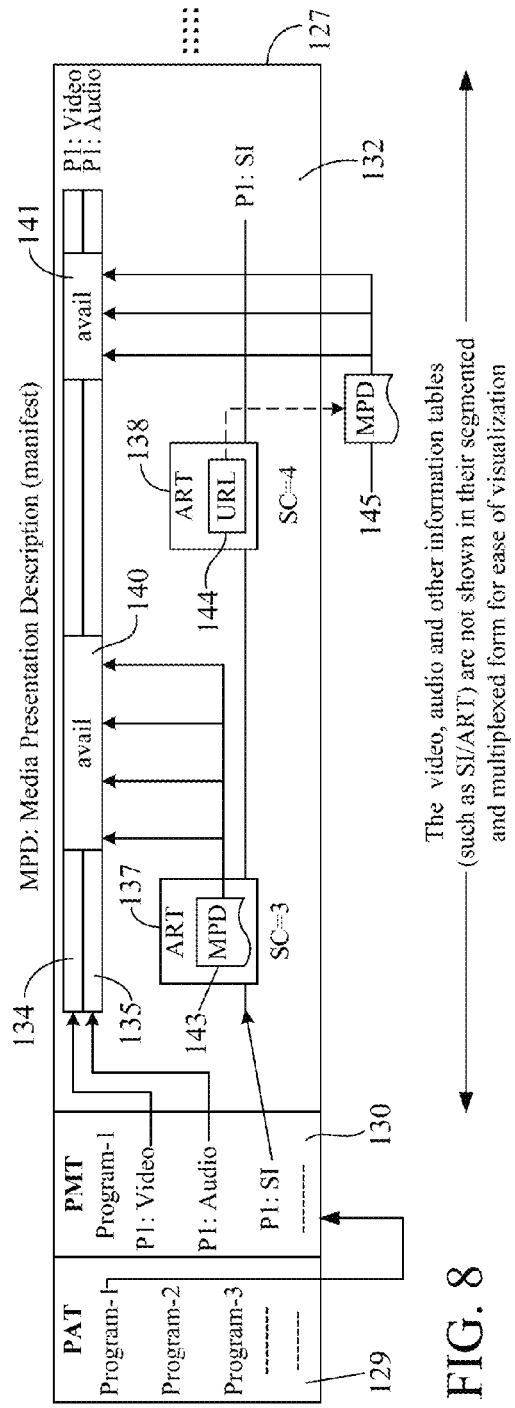
FIG. 8 illustrates how an MPEG DASH manifest may be delivered to a hybrid terminal via a broadcast transport stream to signal timings of available advertising slots for terminal's placement of advertisement.

It is pointed out here that, in FIGS. 7A-7C and also in FIG. 8, the video, audio, and other information tables, such as SCTE 35 markers or ARTs, are not shown in their segmented and multiplexed form for ease of visualization. In actual implementation, an MPEG2 TS may carry many different broadcasted programs and each program may have its own set of such tables. Hence, these tables for such programs may be segmented and/or multiplexed during transmission of the TS to a subscriber terminal. It is also pointed out here that the MPEG2 TS shown in FIGS. 7-8 is used as an example of a transport stream for broadcast/multicast programs, and, similarly, the ART is also used as an example of a transport stream-based table replacing ad insertion markers as per the teachings of the present disclosure. As noted before, the ART may be a DVB SI table. A similar table may be implemented in a non-DVB system such as, for example, in an ATSC or ISDB defined transport stream.

FIG. 7B shows an MPEG2 TS 111, which is essentially the same as the TS 97 in FIG. 7A, except that the SCTE 35 markers 107-109 in the TS 97 are now replaced with corresponding ART tables 113-115 carried in the Service Information (SI) of the TS 111 as per teachings of the present disclosure. Hence, the same reference numerals are used in FIGS. 7A and 7B to refer to the same tables/content, but the reference numeral "117" is used in FIG. 7B for the program portion of Program-1 to distinguish it from the program portion 102 in FIG. 7A because of the presence of the ARTs 113-115 in the TS 111 of FIG. 7B. As shown in FIG. 7B, the initial ART 113 may contain a different indication (the SC=1 value) than each subsequent ART 114-115 with the value of SC=2. Each ART 113-115 may have a format similar to that of the exemplary ART 82 in FIG. 5. In one embodiment, this MPEG2 TS 111 may be delivered to the hybrid terminal 44 to enable the hybrid terminal 44 to manage placement of personalized ads in the manner described before. For example, upon receipt of the ART 113, the hybrid terminal 44 may contact the ADS 60 for an ad list, and the subsequent ART 114 may enable the hybrid terminal to insert personalized ads in the ad slots "Ad2" through "Ad4." In one embodiment, the combination of the ARTs 113-114 in FIG. 7B may be considered to provide the ad insertion opportunity corresponding to the replaced SCTE markers 107-108 in FIG. 7A, and the combination of the ARTs 113 and 115 in FIG. 7B may be considered to provide the ad insertion opportunity corresponding to the replaced ad insertion marker 109 in FIG. 7A. More generally, a single ART may replace one or more SCTE 35 markers in particular embodiments. Alternatively, a combination of ARTs may be used to convey the necessary timing information of multiple SCTE 35 markers to a hybrid terminal.

FIG. 7C shows an MPEG2 TS 120, which is similar to the TS 111 in FIG. 7B, except that the TS 120 includes SI tables 122-124 in addition to the ARTs 113-115 in the TS 111. Hence, the same reference numerals are used in FIGS. 7B and 7C to refer to the same tables/content, but the reference numeral "125" is used in FIG. 7C for the program portion of Program-1 to distinguish it from the program portion 117 in FIG. 7B because of the presence of the additional SI tables 122-124 in the TS 120 of FIG. 7C. In one embodiment, each new SI table 122-124 may be an Application Information Table (AIT) that signals to the hybrid terminal receiving the TS 120 that the ad slot associated with the corresponding AIT has interactivity enabled. For example, the AIT 122 may indicate that the second ad slot (Ad2) has interactivity enabled, and the viewer watching the ad associated with that ad slot may interact with the ad. Similarly, the AIT 123 signals that the ad slot Ad4 contains an ad that allows the viewer to interact with it, and the AIT 124 indicates that the ad in the Ad5 slot has interactivity enabled for it. A user/viewer may interact with an ad for which interactivity is enabled through AITs in a broadcast program's transport stream. Thus, in the embodiment of FIG. 7C, a viewer may not only receive personalized ads, but may also be able to interact with some of those ads.

It is seen from the above discussion that the embodiments in FIGS. 4-7 make use of a broadcast network's backend systems/databases to enable a hybrid terminal to make an ad placement decision. In one embodiment, an SP's ADS may access backend databases using the architecture defined in the earlier-mentioned ANSI/SCTE 130-3 document, titled "Digital Program Insertion—Advertising Systems Interfaces Part 3: Ad Management Service (ADM) Interface" (2013). The present disclosure provides a user "token" which identifies the user's preferences in the SP's subscriber database. Thus, the subscriber database provides the necessary targeting matched with additional information based on analytic data and ongoing ad campaigns to substantially personalize the delivery of ad contents. The SI table-based solution uses an augmented service field in the transport stream to identify both the ADS as well as placement opportunities. Current industry solutions offer "personalization" at a subscription or even broader level, through demographics data or analytics data. In contrast, the ads selected as per teachings of the present disclosure are truly personalized for a specific end user, as opposed to targeted based on general demographics information. Hence, the methodology of the present disclosures allows the SP to charge more from the ad publisher for the ad impression.

FIG. 8 illustrates how an MPEG DASH manifest may be delivered to a hybrid terminal, such as the hybrid terminal 44 in FIG. 3, via a broadcast transport stream to signal timings of available advertising slots for terminal's placement of advertisements. More details about an MPEG DASH based manifest may be obtained from the International Organization for Standardization (ISO)/International Electrotechnical Commission (IEC) standard 23009-1, titled "Information technology—Dynamic adaptive streaming over HTTP (DASH)—Part 1: Media presentation description and segment formats" (2014), and available at www.iso.org; the relevant disclosure of this standard is incorporated herein by reference in its entirety. The HTTP protocol is discussed, for example, in the Internet Engineering Task Force (IETF) Request for Comments (RFC) 2616, titled "Hypertext Transfer Protocol—HTTP/1.1" (June 1999), and available at www.ietf.org; the relevant disclosure of this document is incorporated herein by reference in its entirety. MPEG coding related information may be obtained from the ISO/IEC standard 13818-1, titled "Information technology—Generic coding of moving pictures and associated audio information—Part 1: Systems" (2013), and available at www.iso.org; the relevant disclosure of this standard is incorporated herein by reference in its entirety.

An exemplary MPEG2 TS 127 that may be sent by the SP headend is shown in FIG. 8. The TS 127 is shown to contain a PAT 129 and a PMT 130 (for Program-1 in the PAT), which may be similar to the PAT 99 and PMT 100, respectively, in FIGS. 7A-7C, and, hence, additional discussion of PAT 129 and PMT 130 is not provided herein for the sake of brevity. The TS 127 is also shown with a broadcast TV program portion 132 for Program-1 (P1). The PMT 130 for Program-1 indicates and the broadcast content portion 132 shows that P1 contains a video stream (P1: Video) 134, an audio stream (P1: Audio) 135, and a plurality of SI tables (P1: SI) 137-138, among other content. In one embodiment, the SI tables 137-138 are ARTs, an exemplary format for which is shown in FIG. 5. In the embodiment of FIG. 8, the audio-visual program content portion 132 shows two avails 140-141, instead of ad slots labeled "Ad1," "Ad2," "Ad3," and so on, as in case of the embodiments of FIGS. 7A-7C. It is understood that an "avail" is a time space provided to cable, satellite or terrestrial TV operators or video service providers by national broadcasters during a program for use by the former for placement of ads. Generally, this time is used for showing local/regional advertisements. Hence, typically, the "avail" time is usually sold to local advertisers by such service providers or used for self promotion.

In one embodiment, an MPEG DASH manifest may be directly embedded in an MPEG transport stream of a broadcast/multicast TV signal as shown in the context of the ART 137 in the TS 127. The ART 137 may include a Media Presentation Description (MPD) 143 representing the MPEG DASH manifest associated with the avail 140. In an alternative embodiment, the MPEG TS that is broadcast or multicast may carry a reference/link to the MPEG DASH based manifest, which may be then fetched by the terminal/STB upon reception of the reference/link. This link-based implementation is shown in FIG. 8 in the context of the ART 138 in the TS 127. As shown, the ART 138 may include a URL 144 that allows a terminal, such as the terminal 44 in FIG. 3, to access a server (not shown in FIG. 3) in the SP's broadcast network through a broadband connection to receive the MPD (manifest) 145 associated with the avail 141. How the manifests 143, 145 signal available advertising time slots to a hybrid terminal is discussed later below with references to FIGS. 9-10. In one embodiment, in view of the presence of the MPD 143 or the URL 144, the respective ART 137 or 138 may not include the randomizer field shown in FIG. 5.

In contrast to the embodiments in FIGS. 7B-7C, a new ART 137 (with SC=3) may be used in the embodiment of FIG. 8 to deliver the MPD 143. Similarly, another new ART 138 (with SC=4) may be used to deliver the URL 144. The ARTs in the embodiments of FIGS. 7B-7C have different values for the service_code (SC) field—namely, SC=1 and SC=2.

Although the discussion herein is in the context of using an MPEG DASH based manifest format in a television broadcast/multicast environment, the discussion may equally apply to any equivalent manifest format chosen from another adaptive bit rate technology such as, for example, Microsoft's Silverlight or Apple's HTTP Live Streaming (HLS). Furthermore, the MPEG2 TS 127 is used as an example of an MPEG-based TS in a DVB television network. The manifest may be embedded within an ART in the MPEG transport stream of an ATSC or ISDB broadcast network, or in a multicast delivered media stream such as, for example, Internet Group Management Protocol (IGMP) based multicast stream or Multicast Listener Discovery (MLD) based multicast stream.

In one embodiment, an MPEG DASH manifest, such as the MPDs 143, 145, may contain information about the current TV program and the upcoming advertising insertion slots as well as information to return the terminal/STB back to the program after the advertising material is played out. The current TV program is the program which carried or signaled the manifest to the hybrid terminal. Also, it would be desirable to return to the same program source after insertion of the advertising material to maintain the presentation timeline of the program.

Referring again to FIG. 8, the same manifests 143, 145 may be delivered to all terminals/STBs that are "tuned" to the channel where personalized ad insertion may occur. The content of each manifest 143, 145 describes the program breaks or avails in which advertisement insertion can occur for that channel. The manifests 143, 145 may also provide the links to advertising sources that may provide the ads for the respective program break. In one embodiment, these sources may provide personalized ads for a viewer. The hybrid terminal may choose an appropriate advertising source for a particular time slot depending, for example, on the delivery format of the advertisement content. These and other aspects are discussed below with reference to FIGS. 9-10.

FIG. 9 shows an exemplary sequence of main TV programs 147-150 and associated avails 140-141 in the broadcast content portion 132 of the MPEG2 TS 127 in FIG. 8. Exemplary timestamps associated with the programs are also shown using the values (in seconds) such as t=0, t=600, t=690, and so on. These timestamps are collectively identified using the reference numeral "152." It is seen from the exemplary illustration in FIG. 9 that the first avail 140 represents a time slot of 90 seconds (between the timestamps t=600 and t=690) and the second avail 141 represents a time slot of 120 seconds (between the timestamps t=1770 and t=1890). It is shown in FIG. 9 that the TV program contents 147-150 may be provided by Source-1, whereas advertising content for the avail 140 may be available from two different sources—Source-2 and Source-3, and the advertising content for the avail 141 may be available from only Source-3. Source-2 may offer three ads 154-156, whereas Source-3 may offer ads 157-159. These advertising sources—Source-2 and Source-3—may offer different delivery formats for the advertising material as discussed below with reference to FIG. 10. As discussed later, the hybrid terminal may use the received manifest to select appropriate advertising material for the avail spaces 140-141.

FIG. 10 is an exemplary pseudo representation of an MPD manifest, such as the first MPD manifest 143 in FIG. 8, for the program sequence in FIG. 9. A similar representation may be generated for the other MPD 145 in FIG. 8. As shown using reference numerals "161" and "162" in FIG. 10, the manifest 143 covers timing information starting with timestamp t=0 until the end of the Program Part-3, which is identified by reference numeral "149" in FIG. 9 and having the duration of 600 seconds (starting with timestamp t=1170 and ending with the timestamp t=1770). In one embodiment, at repeated intervals during t=0 and t=600 timestamps, a manifest, like the MPD 143, may be provided or linked to the Program Part-1 (reference numeral "147") in the TS 127 in FIG. 8. For ease of illustration, only one such occurrence of the MPD 143 is shown in FIG. 8. It is noted here that although the timestamps indicated in FIGS. 9-10 are for informational purpose only, such timestamps likely may be the presentation timestamps in the broadcast or multicast content.

It is observed from the manifest 143 in FIG. 10 that the advertising Source-2 and Source-3 may provide advertising material in different delivery formats. For example, as indicated at arrows 163-165 in FIG. 10, the Source-2 may provide advertising material using a Fixed Bit Rate (FBR) delivery format for ads 154-156—indicated as "adslot1" through "adslot3" and "type=fbr" in FIG. 10. Such FBR delivery format may represent progressive playout mechanisms such as Real Time Streaming Protocol (RTSP) or HTTP streaming. On the other hand, as indicated at arrow 166, the Source-3 may provide advertising material using an Adaptive Bit Rate (ABR) delivery format for ad 157—indicated as "adslot3adaptive" and "type=abr" in FIG. 10. Such ABR delivery format may represent multi-bitrate playout mechanisms such as MPEG DASH based content delivery, HTTP Live Streaming (HLS), or Smooth Streaming. Thus, the manifest 143 could signal the availability of advertising in many different formats, such as a single clip for download-and-play or for progressive playout or a multi-bitrate format. In the manifest 143 in FIG. 10, the arrows 167-169 indicate that the program contents 147-149 are delivered as DVB broadcasts. In one embodiment, in addition to or in place of different formats, the contents of the advertising materials from different sources may be different as well.

The manifest 143 in FIG. 10 may indicate at arrows 163-165 that, in case of Source-2, there may three different ads (Ad1-Ad3) 154-156, each having a duration of 30 seconds, to fill the 90-second timeslot 140. The arrow 166 indicates that the Source-3 may provide a single ad (Ad3') 157 to fill the last 30-second portion of the avail 140—starting with the timestamp t=660. In one embodiment, all of these potential ads may be personalized as discussed hereinbefore for the viewer of the hybrid terminal receiving the manifest 143. In one embodiment, the hybrid terminal may choose the first two ads 154-155 from the Source-2 and the last ad 157 from the Source-3 for the avail 140. Although not shown in detail like FIG. 10, the manifest 145 may similarly signal the timings of the avail 141 as well as the source(s)—here, the single Source-3—that have advertisement(s) available for that timeslot.

The manifest 143 may be provided through the TS 127 sufficiently in advance of its associated avail 140 to enable the receiver terminal, such as the hybrid terminal 44 in FIG. 3, to process the manifest and obtain appropriate ad content via its broadband connection before the commencement of the avail 140. In one embodiment, the hybrid terminal 44 may parse the manifest 143 and request the appropriate advertisement content for each "ad slot" of 30-second interval in the avail 140 from one or more servers/sources, like Source-2 and Source-3, identified by respective URLs in the manifest 143. In one embodiment, instead of providing URLs of individual sources qualified to supply ads for respective avails, the manifest 143 may simply include a single URL for the SP ADS 60. In that case, the hybrid terminal 44 may concatenate personalization information to the URL to obtain personalized ads as discussed earlier with references to FIG. 4. In another embodiment, the signal flow in FIG. 4 may be slightly modified to send a manifest-containing ART at step-6 (block 75), which may be processed at step-7 (block 76). Such manifest-containing ART may just include the timestamp-based timing information similar to that shown in FIG. 10, but may not include URLs of advertising sources because such URLs may be already received by the hybrid terminal in step-5 (block 74) of FIG. 4. Other ways to deliver manifest-containing ARTs in conjunction with the embodiment of FIG. 4 may be suitably devised.

Depending on the delivery format of the advertisement content, the terminal/STB may request appropriate advertising media files through its broadband connection. As noted before, the actual advertising file may depend on existing selection heuristics not relevant to the present disclosure. In one embodiment, the terminal's determination of which advertisement file to download—and from which of the available sources—before it is to be inserted in the available time slot may be based on the availability of media storage in the terminal, the bitrate available to perform the download, additional information from the campaign manager regarding ad availability, or other advertisement metadata made available to the terminal.

Because of the delivered manifests, when part of the main program comes to an end, the terminal/STB may already have the necessary information and media files to playout the advertisement(s). In the case where different delivery formats are available, the terminal may have already made some determination on which delivery format or combination of delivery formats to use for available time slots. The details of how the terminal makes such determination may not be relevant to the present disclosure.

In one embodiment, the terminal/STB may also continue to monitor the timestamps in the broadcast or multicast transport stream to ensure that the playout of the advertisement(s) switches back to the main program at appropriate time. In one embodiment, the terminal may need to clip or pad the advertising material to accomplish "seamless" transition back to the main program.

It is observed that MPEG DASH is currently being adopted in most aspects of streaming content delivery both due to its ability to support variation in the available delivery bitrate as well as its flexibility in supporting innovative services. The embodiments in FIGS. 8-10 allow an MPEG DASH manifest to be delivered through a broadcast/multicast transport stream and to be used at the consumer equipment—hybrid terminal or STB—for providing insertion of personalized advertisements. In one embodiment, such a manifest could also be used to deliver non-commercial interstitial programming, such as local or personal news clips, audio content, and the like. Because broadcasting (or multicasting over IP networks) of programming continues to be a significant part of media delivery due to its efficiency and scalability, the MPEG DASH manifest-based solution in the embodiments of FIGS. 8-10 retains those advantages while incorporating the advantages of personalized ad insertion.

FIG. 11 is a block diagram of an exemplary hybrid terminal, such as the terminal 44 in FIG. 3, according to one embodiment of the present disclosure. In one embodiment, as noted before, the terminal 44 may be an IPTV terminal, or a hybrid terminal supporting IPTV functionality or including IP-STB features to process IP multicast content. As mentioned before, the hybrid terminal 44 in FIG. 11 may be configured to perform the relevant terminal-based operations discussed before with reference to FIGS. 2B through 10. Thus, in one embodiment, the terminal 44 may include a processor 172 that may be "configured" in hardware and in software, if necessary, to support the personalized ad insertion aspects of the present disclosure. In FIG. 11, the processor 172 is shown coupled to a system memory 174, a peripheral storage unit 176, an output device such as a display unit 177, and a network interface unit 179. In some embodiments, the terminal 44 may include more than one instance of the devices 172, 176-177, and 179 shown in FIG. 11.

In particular embodiments, the processor 172 may include more than one core, and/or the terminal 44 may include more than one processor, for example, in a distributed processing configuration. When the terminal 44 is a multiprocessor system, there may be more than one instance of the processor 172 or there may be multiple processors (not shown) coupled to the processor 172. It will be appreciated that terminal-related tasks discussed hereinbefore represent various processes which may be substantially performed by the processor 172 in FIG. 11. The processor 172 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor may also employ distributed processing in certain embodiments.

In various embodiments, the system memory 174 may comprise any suitable type of non-transitory memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), Rambus® DRAM, flash memory, and of various types of Read Only Memory (ROM), and the like. In one embodiment, the system memory 174 may include multiple discrete banks of memory controlled by discrete memory interfaces in the embodiments of the processor 172 that provide multiple memory interfaces. Also, in some embodiments, the system memory 174 may include multiple different types of memory, as opposed to a single type of memory. In one embodiment, the system memory 174 may store program code, which may be executed by the processor 172 and, upon execution, the hybrid terminal 44 may be operative to perform various terminal-related steps discussed hereinbefore.

Some or all aspects of the hybrid terminal-based tasks or processing steps may be implemented in a computer program, software, firmware, or microcode incorporated in a non-transitory, computer-readable storage medium, such as the memory 174, for execution by a general purpose computer or a processor, such as the processor 172. In particular embodiments, such computer-readable medium may be part of the peripheral storage 176, or may be part of the system memory 174 or a processor's internal memory, like the internal memory (not shown) of the processor 172. The processor 172 may execute instructions stored on a related computer-readable medium to carry out the software-based processing to enable the hybrid terminal 44 to perform terminal-related steps discussed hereinbefore. Examples of computer-readable storage media include a Read Only Memory (ROM), a Random Access Memory (RAM), a digital register, a cache memory, a cloud-based storage system, semiconductor memory devices, magnetic media such as internal hard disks, magnetic tapes and removable disks, magneto-optical media, and optical media such as CD-ROM disks and Digital Versatile Disks (DVDs).

The peripheral storage unit 176, in various embodiments, may include support for various non-transitory storage media such as, for example, magnetic, optical, magneto-optical, or solid-state storage media like hard drives, optical disks (such as CDs or DVDs), non-volatile RAM devices, and the like. In some embodiments, the peripheral storage unit 176 may include more complex storage devices/systems such as disk arrays (which may be in a suitable RAID (Redundant Array of Independent Disks) configuration) or Storage Area Networks (SANs), which may be coupled to the processor 172 via a standard Small Computer System Interface (SCSI), a Fibre Channel interface, a Firewire® interface (Institute of Electrical and Electronics Engineers (IEEE) 1394 interface), or another suitable interface.

In one embodiment, the memory 174 may store the advertisement list and the advertisements themselves prior to playout. Alternatively, in another embodiment, the peripheral storage unit 176 may perform such storage.

In particular embodiments, the hybrid terminal 44 may be operative to receive and process signals from a user-operated remote control (not shown). The display unit 177 may provide a display of the received TV program and other interstitial programming inserted by the processor 172 into the received transport stream. In one embodiment, the display unit 177 may include a TV screen with an audio speaker. The TV screen may be touch-sensitive in particular embodiments.

In one embodiment, the network interface unit 179 may communicate with the processor 172 to enable the terminal 44 to couple to the broadcast network 46 and the broadband network 20 shown in FIG. 3. The broadcast television interface portion of the unit 179 may allow the hybrid terminal 44 to receive broadcast television programming. On the other hand, the broadband interface portion of the unit 179 may allow the hybrid terminal 44 to interact with television broadcast network servers, retrieve multicast television programming, receive advertisements for subsequent playout, and so on. The interface unit 179 may be configured to enable the hybrid terminal 44 to connect to other types of data networks as well. In one embodiment, the interface unit 179 may include any suitable devices, media and/or protocol content for connecting the hybrid terminal 44 to other devices or entities—whether through wired or wireless means, and whether within a single network or over a combination of networks, including the Internet.

In one embodiment, the hybrid terminal 44 may include an on-board power supply unit 180 to provide electrical power to various system components illustrated in FIG. 11. The power supply unit 180 may receive batteries or may be connectable to an AC electrical power outlet. In one embodiment, the power supply unit 180 may convert solar energy into electrical power.

It is noted here that one or more of the processing entities shown in FIG. 3, such as the VPS 54, the SP headend 59, the ADS 60, the ad server 57, the STB 48, and the databases 62-64, may have architectural configuration similar to the hybrid terminal's configuration in FIG. 11. In some embodiments, these entities may include more or less functional components than those shown in FIG. 11. However, for the sake of brevity, architectural details of each such entity is neither shown nor described in detail in view of the discussion of the configuration in FIG. 11. It is observed, however, that, in alternative embodiments, one or more of these entities and/or the hybrid terminal 44 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. As mentioned before, the functions of various entities shown in FIG. 3 as well as those of the hybrid terminal 44 in FIG. 11 may be provided through the use of hardware (such as circuit hardware) and/or hardware capable of executing software/firmware in the form of coded instructions or microcode stored on a computer-readable medium (mentioned above). Thus, such functions in the embodiments of FIGS. 2A-10 are to be understood as being either hardware-implemented and/or computer-implemented, and thus machine-implemented.

The foregoing describes a system and method for signaling timing and content of interstitial programming, such as personalized ads, to a hybrid terminal via a television broadcast/multicast network. The currently-present ad insertion markers in the transport stream of the broadcast/multicast content are replaced by a Service Information (SI) table that contains information corresponding to the replaced markers. The table-containing transport stream is then delivered to the hybrid terminal. The SI table may include a manifest to signal upcoming time slots for advertising or other interstitial programming. The manifest may provide information about sources from which the hybrid terminal can fetch personalized advertisements and may also identify available time slots in the transport stream into which the fetched ads may be inserted. To enable the hybrid terminal to present highly individualized advertisements to its viewer, the SI table may identify an Ad Decision Server (ADS) from which the hybrid terminal can request targeted ads for playback to the viewer watching a broadcast/multicast TV program. As the personalized advertisements are deliberately targeted at the end user, they can be charged at a premium by the broadcast service provider or TV programming provider.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of signaling interstitial programming to a terminal via a television broadcast network for playback to a viewer associated with the terminal, wherein the terminal is coupled to the television broadcast network and wherein the method comprises performing the following by the television broadcast network:
   receiving broadcast content containing television programs;
   creating a transport stream of the broadcast content;
   preparing a table containing information corresponding to one or more ad insertion markers existing in the broadcast content and used solely in the creation of the transport stream;
   replacing, in the transport stream, the existing ad insertion markers with the table; and
   delivering the transport stream with the table to the terminal to manage placement of interstitial programming during playback of the television programs;
   wherein the interstitial programming includes advertisements, and the table includes a server Uniform Resource Locator (URL) identifying a decision server in the television broadcast network that manages selection of advertisements to the terminal;
   wherein the method further comprises:
       the decision server receiving from the terminal, information individually identifying the viewer of the terminal;
       the decision server obtaining information about one or more viewer-specific personalized advertisements to be retrieved by the terminal for playback to the viewer;
       the decision server sending a result to the terminal, wherein the result identifies viewer-specific personalized advertisements to be retrieved by the terminal, information about a duration of each said viewer-specific personalized advertisement, and a respective content server for each said viewer-specific personalized advertisement;
   wherein the table further includes an indication that notifies the terminal of one or more ad insertion slots available within the transport stream, thereby enabling the terminal to select from the result sent by the decision server, at least one viewer-specific personalized advertisement that is time-wise possible for a specific ad insertion slot within the transport stream.

2. The method of claim 1, wherein the terminal is a hybrid terminal, and wherein the method comprises performing the following by the television broadcast network as part of delivering the transport stream:
   delivering the transport stream with the table to the hybrid terminal using at least one of the following options:
       terrestrial broadcast,
       satellite broadcast, and
       cable broadcast.

3. The method of claim 1, wherein the terminal is an Internet Protocol Television (IPTV) terminal, and wherein the method comprises performing the following by the television broadcast network as part of delivering the transport stream:
   delivering the transport stream with the table to the IPTV terminal using IP multicast.

4. The method of claim 1, wherein the transport stream is a Motion Picture Experts Group 2 (MPEG2) Transport Stream (TS), the table includes a first Digital Video Broadcast (DVB) System Information (SI) table, and the existing ad insertion markers are Society of Cable Telecommunications Engineers 35 (SCTE 35) ad insertion markers.

5. The method of claim 4, wherein the method further comprises performing the following by the television broadcast network as part of delivering the MPEG2 TS with the first DVB SI table to the terminal:
including one of the following in the first DVB SI table:
an MPEG Dynamic Adaptive Streaming over Hypertext Transfer Protocol (DASH) based manifest associated with the broadcast content, or
a Uniform Resource Locator (URL) to the MPEG DASH based manifest,
wherein the MPEG DASH based manifest contains information about timing of upcoming ad insertion slots within the MPEG2 TS, and
wherein, for each ad insertion slot, the MPEG DASH based manifest further contains one or more of the following information:
identification of one or more sources available to supply respective advertising material for the duration of the ad insertion slot, and
for each identified source, a source-specific delivery format for the respective advertising material.

6. The method of claim 4, wherein the method further comprises performing the following by the television broadcast network as part of delivering the MPEG2 TS with the first DVB SI table to the terminal:
placing the server URL for the decision server in the first DVB SI table; and
providing the first DVB SI table to the terminal with a first indication that informs the terminal of the presence of the server URL, thereby enabling the terminal to contact the decision server for advertisements.

7. The method of claim 6, further comprising:
the decision server receiving a request from the terminal, wherein the request includes the information individually identifying the viewer of the terminal; and
the decision server querying one or more databases to obtain the information about one or more viewer-specific personalized advertisements to be retrieved by the terminal for playback to the viewer;
wherein the result sent from the decision server to the terminal includes a respective ad-specific URL for each viewer-specific personalized advertisement, and
wherein each ad-specific URL identifies the respective content server from which a corresponding viewer-specific personalized advertisement is to be retrieved by the terminal.

8. The method of claim 7, wherein the table further includes a second DVB SI table, and wherein the method further comprises performing the following by the television broadcast network:
preparing the second DVB SI table with a second indication that notifies the terminal of the one or more ad insertion slots available within the MPEG2 TS; and
delivering the second DVB SI table with the second indication to the terminal via the MPEG2 TS.

9. The method of claim 1, wherein the method further comprises performing the following by the television broadcast network:
receiving viewer-specific information from the viewer, wherein the viewer-specific information includes personal user preferences of the viewer along with the information individually identifying the viewer;
storing the received viewer-specific information; and
using the stored viewer-specific information to select the one or more viewer-specific personalized advertisements to be sent to the terminal for playback to the viewer.

10. A method of presenting interstitial programming on a terminal associated with a viewer, wherein the terminal is coupled to a television broadcast network that delivers broadcast television programs to the terminal, and wherein the method comprises performing the following by the terminal:
receiving a transport stream of the broadcast television programs from the television broadcast network, wherein the transport stream includes a table that contains timing information which is equivalent to the timing information conveyed by ad insertion markers that were previously present in the broadcast content prior to the receipt of the transport stream by the terminal;
processing the timing information in the table to identify time slots in the transport stream that are available for interstitial programming; and
managing placement of interstitial programming in the identified time slots during playback of the television programs on the terminal;
wherein the transport stream is a Motion Picture Experts Group 2 (MPEG2) Transport Stream (TS), the table includes a first Digital Video Broadcast (DVB) System Information (SI) table, and the ad insertion markers are Society of Cable Telecommunications Engineers 35 (SCTE 35) ad insertion markers;
wherein the interstitial programming includes advertisements, and wherein the method further comprises performing the following by the terminal:
receiving an MPEG Dynamic Adaptive Streaming over Hypertext Transfer Protocol (DASH) based manifest through the first DVB SI table, wherein the MPEG DASH based manifest contains:
information about timing of upcoming ad insertion slots within the MPEG2 TS, wherein the ad insertion slots are the time slots available for advertisements,
for each ad insertion slot, identification of one or more sources available to supply advertising material for the duration of the ad insertion slot, and
for each identified source, a source-specific delivery format for the advertising material;
parsing the MPEG DASH based manifest to identify the one or more sources;
based on the parsing of the MPEG DASH based manifest, requesting respective advertising material from one or more identified sources depending on the source-specific delivery format;
receiving the requested advertising material;
storing the received advertising material; and
placing at least some of the received advertising material into one or more of the upcoming ad insertion slots for presentation to the viewer.

11. The method of claim 10, wherein the terminal is a hybrid terminal, and wherein the method comprises performing the following by the hybrid terminal as part of receiving the transport stream:
receiving the transport stream with the table via at least one of the following options:
terrestrial broadcast,
satellite broadcast, and
cable broadcast.

12. The method of claim 10, wherein the terminal is an Internet Protocol Television (IPTV) terminal, and wherein the method comprises performing the following by the IPTV terminal as part of receiving the transport stream:
  receiving the transport stream with the table via IP multicast.

13. The method of claim 10, wherein receiving the MPEG DASH based manifest includes performing the following by the terminal:
  receiving a Uniform Resource Locator (URL) to the MPEG DASH based manifest through the first DVB SI table; and
  fetching the MPEG DASH based manifest using the URL.

14. The method of claim 10, wherein the method further comprises performing the following by the terminal:
  sending a report to the television broadcast network, wherein the report contains information about the portion of the received advertising material played back to the viewer by the terminal.

15. A method of presenting interstitial programming on a terminal associated with a viewer, wherein the terminal is coupled to a television broadcast network that delivers broadcast television programs to the terminal, and wherein the method comprises performing the following by the terminal:
  receiving a transport stream of the broadcast television programs from the television broadcast network, wherein the transport stream includes a table that contains timing information which is equivalent to the timing information conveyed by ad insertion markers that were previously present in the broadcast content prior to the receipt of the transport stream by the terminal;
  processing the timing information in the table to identify time slots in the transport stream that are available for interstitial programming; and
  managing placement of interstitial programming in the identified time slots during playback of the television programs on the terminal;
  wherein the transport stream is a Motion Picture Experts Group 2 (MPEG2) Transport Stream (TS), the table includes a first Digital Video Broadcast (DVB) System Information (SI) table, and the ad insertion markers are Society of Cable Telecommunications Engineers 35 (SCTE 35) ad insertion markers;
  wherein the interstitial programming includes advertisements, and wherein the method further comprises performing the following by the terminal as part of managing placement of interstitial programming:
  receiving the first DVB SI table with a server Uniform Resource Locator (URL) therein, wherein the server URL identifies a decision server in the television broadcast network that manages selection and delivery of advertisements to the terminal;
  receiving a user ID from the viewer, wherein the user ID individually identifies the viewer;
  augmenting the server URL by appending the server URL with the user ID along with a device ID of the terminal;
  sending a request to the decision server using the augmented server URL; and
  receiving a result from the decision server, wherein the result includes a respective ad-specific URL for each viewer-specific personalized advertisement to be retrieved by the terminal and information about corresponding duration of each viewer-specific personalized advertisement to be retrieved by the terminal, and wherein each ad-specific URL identifies a respective content server from which a corresponding viewer-specific personalized advertisement is to be retrieved by the terminal.

16. The method of claim 15, wherein the table further includes a second DVB SI table, and wherein the method further comprises performing the following by the terminal as part of managing placement of interstitial programming:
  receiving the second DVB SI table from the television broadcast network, wherein the second DVB SI table notifies the terminal of one or more ad insertion slots available within the MPEG2 TS;
  based on the result received from the decision server, selecting at least one viewer-specific personalized advertisement that is time-wise possible for a specific ad insertion slot within the MPEG2 TS;
  retrieving the selected viewer-specific personalized advertisement from the respective content server using the ad-specific URL for the content server; and
  presenting the retrieved viewer-specific personalized advertisement to the viewer.

17. The method of claim 16, wherein presenting the retrieved viewer-specific personalized advertisement includes further performing the following by the terminal:
  removing from the MPEG2 TS all advertisements pre-assigned by the television broadcast network to the specific ad insertion slot; and
  replacing the pre-assigned advertisements removed from the MPEG2 TS with the retrieved viewer-specific personalized advertisement.

18. The method of claim 16, wherein the method further comprises performing the following by the terminal:
  sending a report to the television broadcast network, wherein the report contains information about each viewer-specific personalized advertisement retrieved from the respective content server and played back to the viewer by the terminal.

19. The method of claim 16, further comprising performing the following by the terminal:
  receiving an updated version of the first DVB SI table from the television broadcast network via the MPEG2 TS, wherein the updated version of the first DVB SI table contains the server URL;
  discarding all viewer-specific personalized advertisements retrieved prior to receiving the updated version of the first DVB SI table; and
  re-sending the request to the decision server using the server URL to obtain a revised set of ad-specific URLs.

20. The method of claim 15, wherein the method further comprises performing the following by the terminal:
  retrieving all the viewer-specific personalized advertisements from the respective content servers identified in the result received from the decision server;
  storing all the retrieved viewer-specific personalized advertisements; and
  for each ad insertion slot within the MPEG2 TS, selecting one viewer-specific personalized advertisement at a time from the stored viewer-specific personalized advertisements for presentation to the viewer.

21. A television broadcast network for signaling advertisements to a terminal for playback to a viewer associated with the terminal, wherein the terminal is coupled to the television broadcast network, and wherein the television broadcast network comprises:
  a video processing system that receives broadcast content containing television programming and generates a Motion Picture Experts Group 2 (MPEG2) Elementary Stream (ES) of the broadcast content; and a headend coupled to the video processing system and the terminal, wherein the headend is operative to:
create an MPEG2 Transport Stream (TS) from the MPEG2 ES of the broadcast content,
prepare a Digital Video Broadcast (DVB) System Information (SI) table containing information corresponding to one or more Society of Cable Telecommunications Engineers 35 (SCTE 35) ad insertion markers associated with the MPEG2 TS,
substitute the one or more SCTE 35 ad insertion markers in the MPEG2 TS with the DVB SI table, and
deliver the MPEG2 TS with the DVB SI table to the terminal to manage placement of advertisements during playback of the television programming;
wherein the DVB SI table collectively includes a first DVB SI table and a second DVB SI table, and wherein the television broadcast network further comprises:
a database to receive and store viewer-specific information along with other pertinent information for the viewer, wherein the viewer-specific information includes personal viewing preferences of the viewer and a user ID that individually identifies the viewer; and
a decision server coupled to the database and the terminal, wherein the decision server is operative to:
receive a request from the terminal, wherein the request includes the user ID,
query the database with the user ID to generate information about one or more viewer-specific personalized advertisements to be sent to the terminal for playback to the viewer, and
send a result to the terminal, wherein the result includes a list of ad-specific Uniform Resource Locators (URLs) associated with the one or more viewer-specific personalized advertisements and information about duration of each viewer-specific personalized advertisement, and wherein each ad-specific URL identifies a respective content server from which a corresponding viewer-specific personalized advertisement is to be retrieved by the terminal,
wherein the headend is further operative to:
place a server URL of the decision server in the first DVB SI table,
send the first DVB SI table with the server URL to the terminal via the MPEG2 TS to enable the terminal to send the request to the decision server,
prepare the second DVB SI table that notifies the terminal of one or more ad insertion slots available within the MPEG2 TS, thereby enabling the terminal to select from the result sent by the decision server at least one viewer-specific personalized advertisement that is time-wise possible for a specific ad insertion slot within the MPEG2 TS, and
send the second DVB SI table to the terminal via the MPEG2 TS.

22. A hybrid terminal for presenting advertisements to a viewer associated with the hybrid terminal, wherein the hybrid terminal is coupled to a television broadcast network that delivers broadcast television programs to the hybrid terminal, and wherein the hybrid terminal comprises:
a display unit for displaying the advertisements to the user;
a memory for storing program instructions;
a network interface for receiving broadcast and broadband content; and
a processor coupled to the memory, the display unit, and the network interface, and configured to execute the program instructions, whereby the hybrid terminal is operative to:
receive a Motion Picture Experts Group 2 (MPEG2) Transport Stream (TS) of the broadcast television programs from the television broadcast network, wherein the MPEG2 TS includes a Digital Video Broadcast (DVB) System Information (SI) table instead of Society of Cable Telecommunications Engineers 35 (SCTE 35) ad insertion markers, and wherein the DVB SI table contains timing information that is equivalent to the timing information conveyed by the SCTE 35 ad insertion markers,
process the timing information in the DVB SI table to identify time slots in the MPEG2 TS that are available for the advertisements, and
manage placement of the advertisements in the identified time slots during playback of the television programs so as to present the advertisements to the viewer through the display unit;
wherein, upon execution of the program instructions by the processor, the hybrid terminal is further operative to perform the following:
receive an MPEG Dynamic Adaptive Streaming over HTTP (DASH) based manifest through the DVB SI table, wherein the MPEG DASH based manifest contains:
information about timing of upcoming ad insertion slots within the MPEG2 TS, wherein the ad insertion slots are the time slots available for the advertisements, and
for each ad insertion slot, identification of one or more sources available to supply respective advertising material for the duration of the ad insertion slot;
parse the MPEG DASH based manifest to identify the one or more sources;
based on the parsing of the MPEG DASH based manifest, request respective advertising material from one or more identified sources;
receive the requested advertising material;
store the received advertising material in the memory; and
place at least a portion of the received advertising material into one or more of the upcoming ad insertion slots for presentation to the viewer through the display unit.

23. The hybrid terminal of claim 22, wherein, upon execution of the program instructions by the processor, the hybrid terminal is further operative to perform the following:
send a report to the television broadcast network, wherein the report contains information about the portion of the received advertising material played back to the viewer by the hybrid terminal.

24. A hybrid terminal for presenting advertisements to a viewer associated with the hybrid terminal, wherein the hybrid terminal is coupled to a television broadcast network that delivers broadcast television programs to the hybrid terminal, and wherein the hybrid terminal comprises:
a display unit for displaying the advertisements to the user;
a memory for storing program instructions;
a network interface for receiving broadcast and broadband content; and
a processor coupled to the memory, the display unit, and the network interface, and configured to execute the program instructions, whereby the hybrid terminal is operative to:

receive a Motion Picture Experts Group 2 (MPEG2) Transport Stream (TS) of the broadcast television programs from the television broadcast network, wherein the MPEG2 TS includes a Digital Video Broadcast (DVB) System Information (SI) table instead of Society of Cable Telecommunications Engineers 35 (SCTE 35) ad insertion markers, and wherein the DVB SI table contains timing information that is equivalent to the timing information conveyed by the SCTE 35 ad insertion markers, process the timing information in the DVB SI table to identify time slots in the MPEG2 TS that are available for the advertisements, and manage placement of the advertisements in the identified time slots during playback of the television programs so as to present the advertisements to the viewer through the display unit;

wherein the DVB SI table collectively includes a first DVB SI table and a second DVB SI table, and wherein, upon execution of the program instructions by the processor, the hybrid terminal is further operative to perform the following:

receive the first DVB SI table through the MPEG2 TS from the television broadcast network;

receive a server Uniform Resource Locator (URL) through the first DVB SI table, wherein the server URL identifies a decision server in the television broadcast network;

receive a user ID from the viewer, wherein the user ID individually identifies the viewer;

augment the server URL by appending the server URL with the user ID;

send a request to the decision server using the augmented server URL;

receive a result from the decision server, wherein the result includes a respective ad-specific URL for each viewer-specific personalized advertisement to be retrieved by the hybrid terminal and information about corresponding duration of each viewer-specific personalized advertisement to be retrieved by the hybrid terminal, and wherein each ad-specific URL identifies a respective content server from which a corresponding viewer-specific personalized advertisement is to be retrieved by the hybrid terminal;

receive the second DVB SI table through the MPEG2 TS from the television broadcast network, wherein the second DVB SI table contains information about one or more ad insertion slots available within the MPEG2 TS;

based on the result received from the decision server, select at least one viewer-specific personalized advertisement that is time-wise possible for a specific ad insertion slot within the MPEG2 TS;

retrieve the selected viewer-specific personalized advertisement using the ad-specific URL for the respective content server;

remove from the MPEG2 TS all advertisements pre-assigned by the television broadcast network to the specific ad insertion slot;

replace the pre-assigned advertisements removed from the MPEG2 TS with the retrieved viewer-specific personalized advertisement; and present the retrieved viewer-specific personalized advertisement to the viewer through the display unit.

25. The hybrid terminal of claim 24, wherein, upon execution of the program instructions by the processor, the hybrid terminal is further operative to perform the following:

send a report to the television broadcast network, wherein the report contains information about each viewer-specific personalized advertisement retrieved from the respective content server and played back to the viewer by the hybrid terminal.

* * * * *